US012749933B2

(12) United States Patent
Tess et al.

(10) Patent No.: US 12,749,933 B2
(45) Date of Patent: Sep. 29, 2026

(54) ELECTRIC MOTOR

(71) Applicant: MILWAUKEE ELECTRIC TOOL CORPORATION, Brookfield, WI (US)

(72) Inventors: Andrew R. Tess, Saint Francis, WI (US); Linnea Emerson, Lisbon, WI (US); Matthew R. Bailey, Racine, WI (US); Jeffrey C. Hessenberger, Neosho, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 77 days.

(21) Appl. No.: 18/532,223

(22) Filed: Dec. 7, 2023

(65) Prior Publication Data

US 2024/0204586 A1 Jun. 20, 2024

Related U.S. Application Data

(60) Provisional application No. 63/387,882, filed on Dec. 16, 2022, provisional application No. 63/387,619, filed on Dec. 15, 2022.

(51) Int. Cl.
*H02K 1/18* (2006.01)
*H02K 3/28* (2006.01)
(Continued)

(52) U.S. Cl.
CPC ................. *H02K 1/18* (2013.01); *H02K 3/28* (2013.01); *H02K 3/345* (2013.01);
(Continued)

(58) Field of Classification Search
CPC ....................... H02K 3/32–38; H02K 2203/12
(Continued)

(56) References Cited

U.S. PATENT DOCUMENTS 6,445,097 B1 9/2002 Zeiler et al.
6,701,604 B2 3/2004 Zeiler et al.
(Continued)

FOREIGN PATENT DOCUMENTS

| | | | |
|---|---|---|---|
| CN | 216981644 | U | 7/2022 |
| DE | 102016213710 | A1 | 2/2018 |
| EP | 4037162 | A1 | 8/2022 |

OTHER PUBLICATIONS

Extended European Search Report for Application No. 23216440.0 dated May 24, 2024 (9 pages).

*Primary Examiner* — Oluseye Iwarere
*Assistant Examiner* — Minki Chang
(74) *Attorney, Agent, or Firm* — Michael Best & Friedrich LLP

(57) ABSTRACT

An electric motor may include a rotor assembly including a rotor shaft defining a rotational axis. An electric motor may include a stator assembly including a core, an insulator at least partially covering the core, and a plurality of windings, the insulator defining one of a post that protrudes in an axial direction parallel with the rotational axis or a receptacle in which the post is receivable. An electric motor may include a bus bar assembly including a non-conductive body and a plurality of conductors configured to make an electrical connection between at least two windings of the plurality of windings, the non-conductive body including the other of the post or the receptacle, wherein the receptacle includes at least one of an aperture or a recess, and wherein the post is received within the receptacle to secure the non-conductive body to the insulator.

2 Claims, 21 Drawing Sheets

(51) Int. Cl.
*H02K 3/34* (2006.01)
*H02K 11/00* (2016.01)
*H02K 15/33* (2025.01)

(52) U.S. Cl.
CPC ......... *H02K 11/0094* (2013.01); *H02K 15/33* (2025.01); *H02K 2203/03* (2013.01); *H02K 2203/09* (2013.01)

(58) Field of Classification Search
USPC ........................................ 310/49.13, 216.105
See application file for complete search history.

(56) References Cited

U.S. PATENT DOCUMENTS

| | | | | |
|---|---|---|---|---|
| 6,927,512 | B2 | 8/2005 | Zeiler et al. | |
| 7,262,529 | B2 | 8/2007 | Klappenbach et al. | |
| 8,450,898 | B2 | 5/2013 | Sears et al. | |
| 8,816,558 | B2 | 8/2014 | Sears et al. | |
| 9,024,490 | B2 | 5/2015 | Fujisaki | |
| 9,882,444 | B2 | 1/2018 | Murakami et al. | |
| 9,948,162 | B2 * | 4/2018 | Nagahama | H02K 11/215 |
| 10,256,694 | B2 | 4/2019 | Fukunaga et al. | |
| 10,263,488 | B2 | 4/2019 | Yang et al. | |
| 10,686,344 | B2 | 6/2020 | Csoti et al. | |
| 10,848,042 | B2 | 11/2020 | Beyerl et al. | |
| 10,862,376 | B2 | 12/2020 | Kouda et al. | |
| 11,025,129 | B2 | 6/2021 | Fukunaga et al. | |
| 11,114,927 | B2 | 9/2021 | Beyerl et al. | |
| 11,355,983 | B2 | 6/2022 | Naito | |
| 11,374,528 | B2 | 6/2022 | Sheeks et al. | |
| D960,086 | S | 8/2022 | Schwalbach et al. | |
| 11,462,794 | B2 | 10/2022 | Sheeks et al. | |
| 11,476,527 | B2 | 10/2022 | Sheeks et al. | |
| 2006/0091745 | A1 | 5/2006 | Klappenbach et al. | |
| 2006/0138894 | A1 * | 6/2006 | Harada | H02K 15/02 310/156.19 |
| 2013/0259674 | A1 | 10/2013 | Sears et al. | |
| 2019/0006980 | A1 | 1/2019 | Sheeks et al. | |
| 2019/0190343 | A1 * | 6/2019 | Han | H02K 5/22 |
| 2020/0106380 | A1 | 4/2020 | Sheeks et al. | |
| 2020/0259385 | A1 * | 8/2020 | Hishida | H02K 3/46 |
| 2021/0281138 | A1 | 9/2021 | Heer et al. | |
| 2021/0281152 | A1 | 9/2021 | Heer et al. | |
| 2021/0296955 | A1 | 9/2021 | Yamada et al. | |
| 2021/0384809 | A1 | 12/2021 | Beyerl et al. | |
| 2022/0006347 | A1 * | 1/2022 | Fujii | H02K 9/06 |
| 2022/0094251 | A1 | 3/2022 | Niwa | |
| 2022/0131439 | A1 | 4/2022 | Kang et al. | |
| 2022/0247269 | A1 | 8/2022 | Jefferies et al. | |
| 2022/0320939 | A1 | 10/2022 | Naito | |
| 2022/0337121 | A1 | 10/2022 | Niwa | |
| 2022/0354052 | A1 | 11/2022 | Jefferies et al. | |

* cited by examiner

ELECTRIC MOTOR

CROSS-REFERENCE TO RELATED APPLICATIONS

This application claims priority to U.S. Provisional Patent Application No. 63/387,882, filed Dec. 16, 2022, and to U.S. Provisional Patent Application No. 63/387,619, filed Dec. 15, 2022, the entire content of each of which is hereby incorporated by reference.

FIELD OF THE DISCLOSURE

The present disclosure relates to electric motors, and more specifically to stators for electric motors.

BACKGROUND OF THE DISCLOSURE

A stator assembly for an electric motor can be formed from a plurality of annular stator segments arranged into a tubular shape. A bus bar assembly can be formed separately from the stator assembly and then subsequently coupled to the stator assembly. A printed circuit board assembly can be coupled to the bus bar assembly.

SUMMARY OF THE DISCLOSURE

The present disclosure provides, in one aspect, an electric motor including a rotor assembly including a rotor shaft defining a rotational axis. The electric motor also includes a stator assembly including a core, an insulator at least partially covering the core, and a plurality of windings, the insulator defining one of a post that protrudes in an axial direction parallel with the rotational axis or a receptacle in which the post is receivable. The electric motor further includes a bus bar assembly including a non-conductive body and a plurality of conductors configured to make an electrical connection between at least two windings of the plurality of windings, the non-conductive body including the other of the post or the receptacle. The receptacle includes at least one of an aperture or a recess, and the post is received within the receptacle to secure the non-conductive body to the insulator.

In some aspects, the techniques described herein relate to an electric motor, wherein the non-conductive body includes a radially protruding arm, and wherein the one of the post or the receptacle is defined by the radially protruding arm.

In some aspects, the techniques described herein relate to an electric motor, wherein the receptacle includes an aperture and is defined by the non-conductive body, and wherein the post extends entirely through the aperture between a first axially facing surface of the non-conductive body and an opposite, second axially facing surface of the non-conductive body.

In some aspects, the techniques described herein relate to an electric motor, wherein the post is cylindrical.

In some aspects, the techniques described herein relate to an electric motor, wherein the receptacle is defined by the non-conductive body and includes a recess that extends only partially through the non-conductive body in an axial direction.

In some aspects, the techniques described herein relate to an electric motor, wherein the non-conductive body further defines a relief aperture that communicates with the recess, and wherein a shoulder is defined between the recess and the relief aperture.

In some aspects, the techniques described herein relate to an electric motor, further including a printed circuit board assembly (PCBA) defining a mounting aperture, and wherein the non-conductive body further defines a mounting post that is received by the mounting aperture to secure the PCBA to the non-conductive body.

In some aspects, the techniques described herein relate to an electric motor, further including a rotor bearing that rotatably supports the rotor shaft, wherein the non-conductive body further defines a bearing pocket that receives and supports the rotor bearing.

In some aspects, the techniques described herein relate to an electric motor, wherein the core is a first core and the insulator is a first insulator, and wherein the stator assembly includes a plurality of stator segments including a first stator segment and a second stator segment positioned adjacent the first stator segment in a circumferential direction, and wherein the first stator segment includes the first core, the first insulator, and a first winding of the plurality of windings, and wherein the second stator segment includes a second core, a second insulator, and a second winding of the plurality of windings.

In some aspects, the techniques described herein relate to an electric motor, wherein the receptacle is a first receptacle of a plurality of receptacles defined by the non-conductive body, and wherein the post is a first post defined by the first insulator, and wherein the second insulator defines a second post that is received by a second receptacle of the plurality of receptacles to secure the non-conductive body to the second insulator.

In some aspects, the techniques described herein relate to an electric motor, wherein the post and the receptacle are made from a thermoplastic material that melts in response to being heated above a melt temperature and bonds in response to being subsequently cooled below the melt temperature to affix the non-conductive body to the insulator.

The present disclosure provides, in another aspect, an electric motor including a rotor assembly including a rotor shaft. The electric motor also includes a stator assembly including a core, an insulator at least partially covering the core, and a plurality of windings. The electric motor further includes a bus bar assembly including a non-conductive body and a plurality of conductors configured to make an electrical connection between at least two windings of the plurality of windings, the non-conductive body defining a mounting post. The electric motor also includes a printed circuit board assembly (PCBA) defining a mounting aperture that receives the mounting post to secure the PCBA to the non-conductive body.

In some aspects, the techniques described herein relate to an electric motor, wherein the non-conductive body defines an annular recess that receives the PCBA.

In some aspects, the techniques described herein relate to an electric motor, wherein the PCBA includes a circular peripheral edge and a mounting arm that protrudes radially from the circular peripheral edge, and wherein the mounting arm defines the mounting aperture.

In some aspects, the techniques described herein relate to an electric motor, wherein the non-conductive body further defines a locating protrusion that protrudes into the annular recess, and wherein the PCBA includes a circular peripheral edge and a locating notch that interrupts the circular peripheral edge, and wherein the locating notch receives the locating protrusion.

In some aspects, the techniques described herein relate to an electric motor, wherein the insulator defines an insulator post that protrudes axially away from the core, and wherein the non-conductive body defines a receptacle that receives the insulator post to secure the non-conductive body to the insulator, the receptacle including at least one of an aperture or a recess.

In some aspects, the techniques described herein relate to an electric motor, wherein the core is a first core and the insulator is a first insulator, and wherein the stator assembly includes a plurality of stator segments including a first stator segment and a second stator segment positioned adjacent the first stator segment in a circumferential direction, and wherein the first stator segment includes the first core, the first insulator, and a first winding of the plurality of windings, and wherein the second stator segment includes a second core, a second insulator, and a second winding of the plurality of windings.

The present disclosure provides, in another aspect, a method of assembling an electric motor, the method including providing a rotor assembly including a rotor shaft. The method also includes providing a stator assembly including a core, an insulator at least partially covering the core, and a plurality of windings. The method further includes providing a bus bar assembly including a non-conductive body and a plurality of conductors. The method also includes ultrasonically welding the non-conductive body to the insulator. The method further includes making an electrical connection between at least two windings of the plurality of windings and the plurality of conductors.

In some aspects, the techniques described herein relate to a method, wherein the non-conductive body includes an inboard surface facing toward the insulator, and wherein the insulator includes a coil protector portion having an axially outer surface, and wherein ultrasonically welding the non-conductive body to the insulator produces an ultrasonic weld located where the inboard surface contacts the axially outer surface.

In some aspects, the techniques described herein relate to a method, further including inserting a bearing within a bearing pocket of the non-conductive body, wherein the bearing pocket defines an outer circumferential surface, and wherein the insulator includes a coil protector portion having an inner annular surface, and wherein ultrasonically welding the non-conductive body to the insulator produces an ultrasonic weld located where the outer circumferential surface contacts the inner annular surface.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
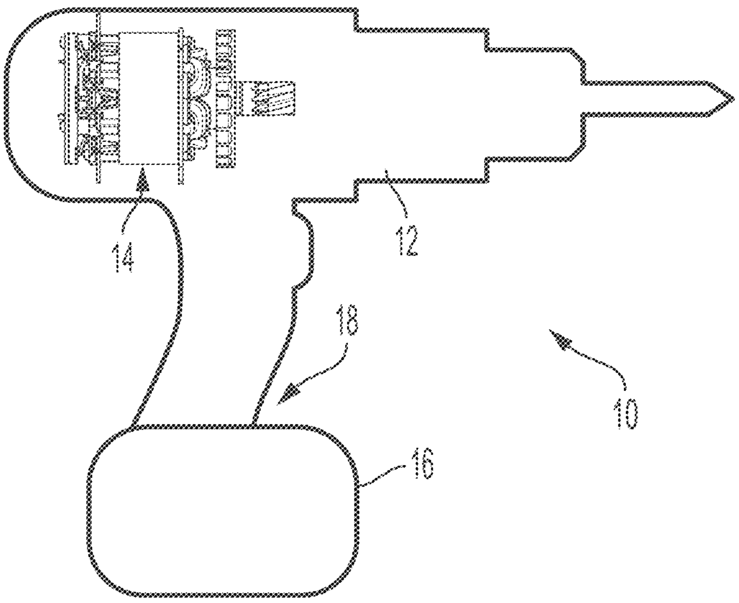
FIG. 1 is a perspective view of a power tool according to one embodiment.
Figure 2:
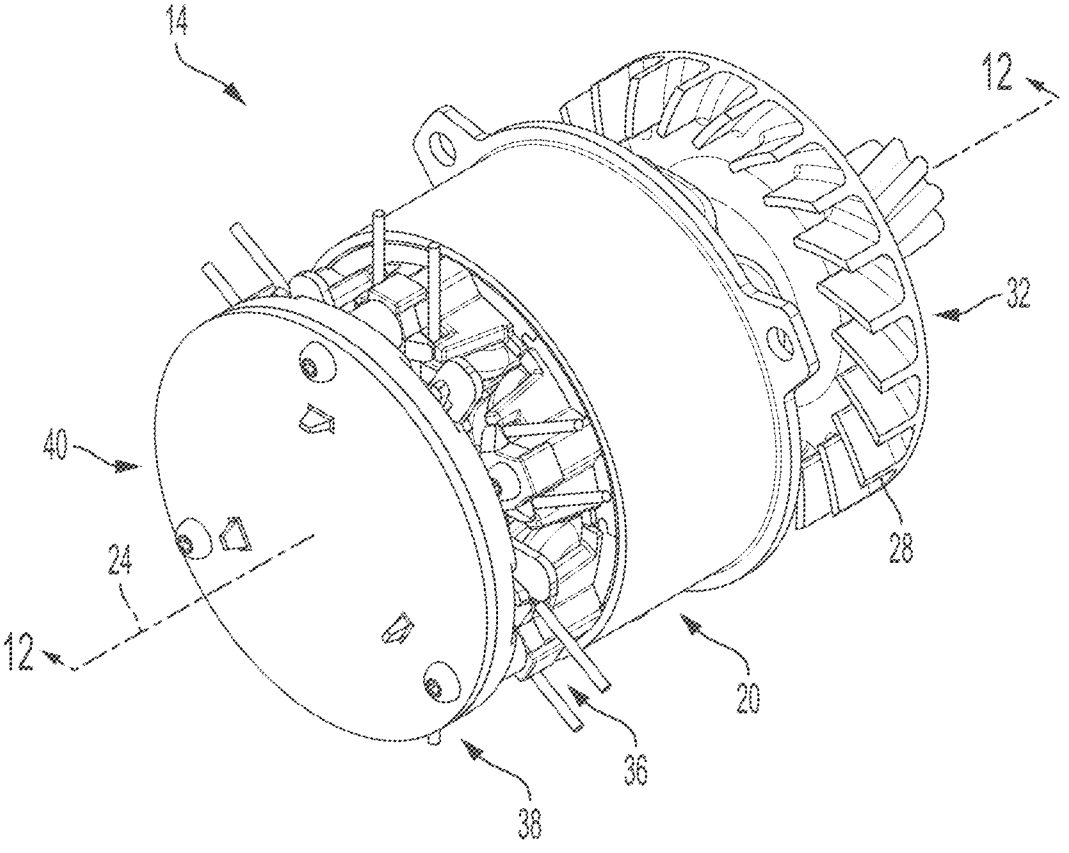
FIG. 2 is a perspective view of an electric motor of the power tool of FIG. 1.

FIGS. 1 and 2 illustrate a power tool 10 such as, e.g., a drill, a rotary impact tool, and the like. The power tool 10 includes a housing 12 and an electric motor 14. The power tool 10 is operable with a battery pack 16 removably coupled to a battery receptacle 18 located at a bottom end of the housing 12. The battery pack 16 includes a plurality of battery cells (not shown), which are electrically connected to provide the desired output (e.g., nominal voltage, current capacity, etc.) of the battery pack 16. The electric motor 14 receives power from the battery pack 16 when the battery pack 16 is coupled to the battery receptacle 18.

In some embodiments, the power tool 10 may include a power cord for electrically connecting the motor 14 to a source of AC power. The battery pack 16 is the preferred means for powering the power tool 10, however, because a cordless power tool can be used in locations where other power sources are unavailable.

Figure 3:
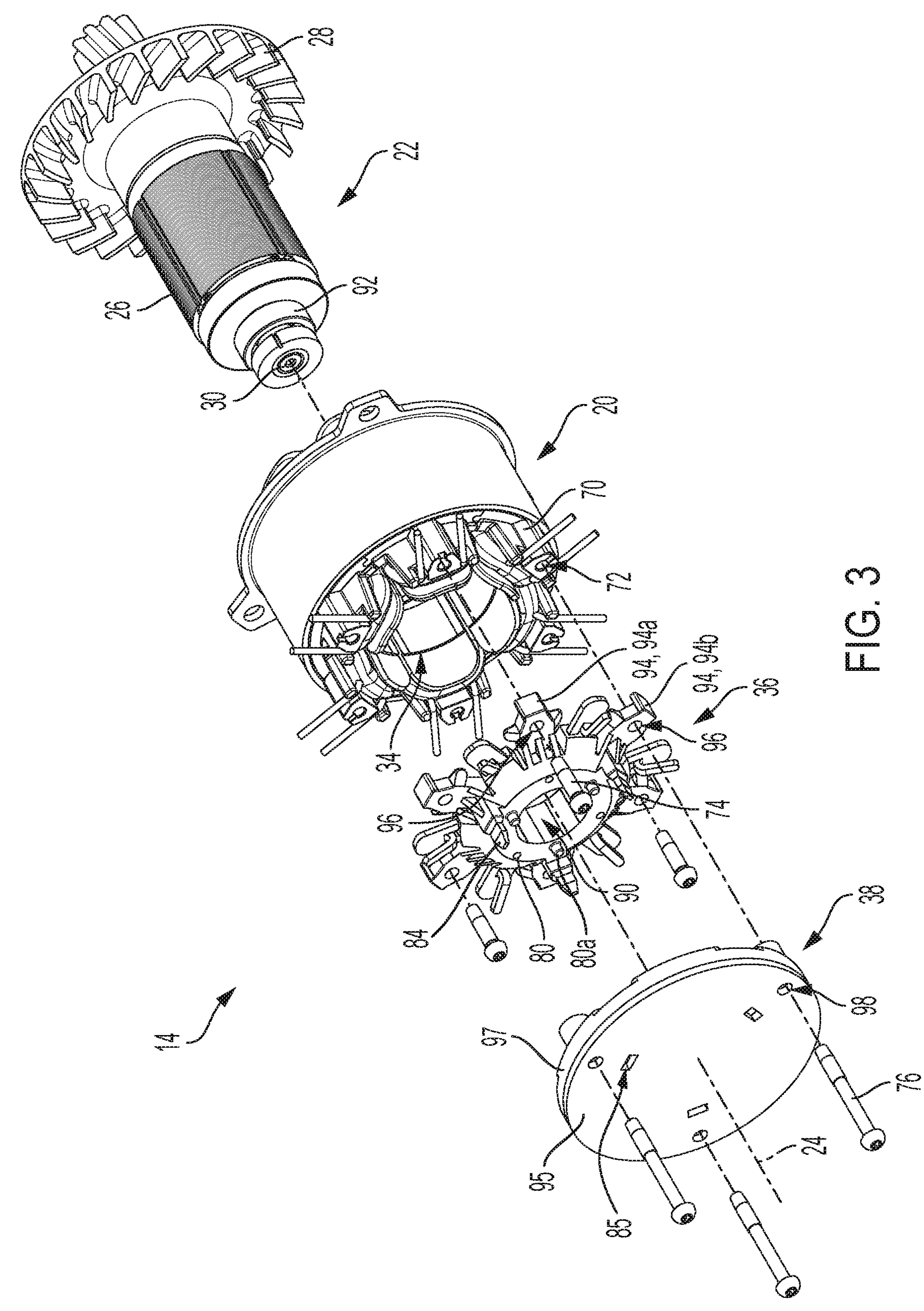
FIGS. 3 and 4 are exploded perspective views of the electric motor of FIG. 2.
Figure 4:
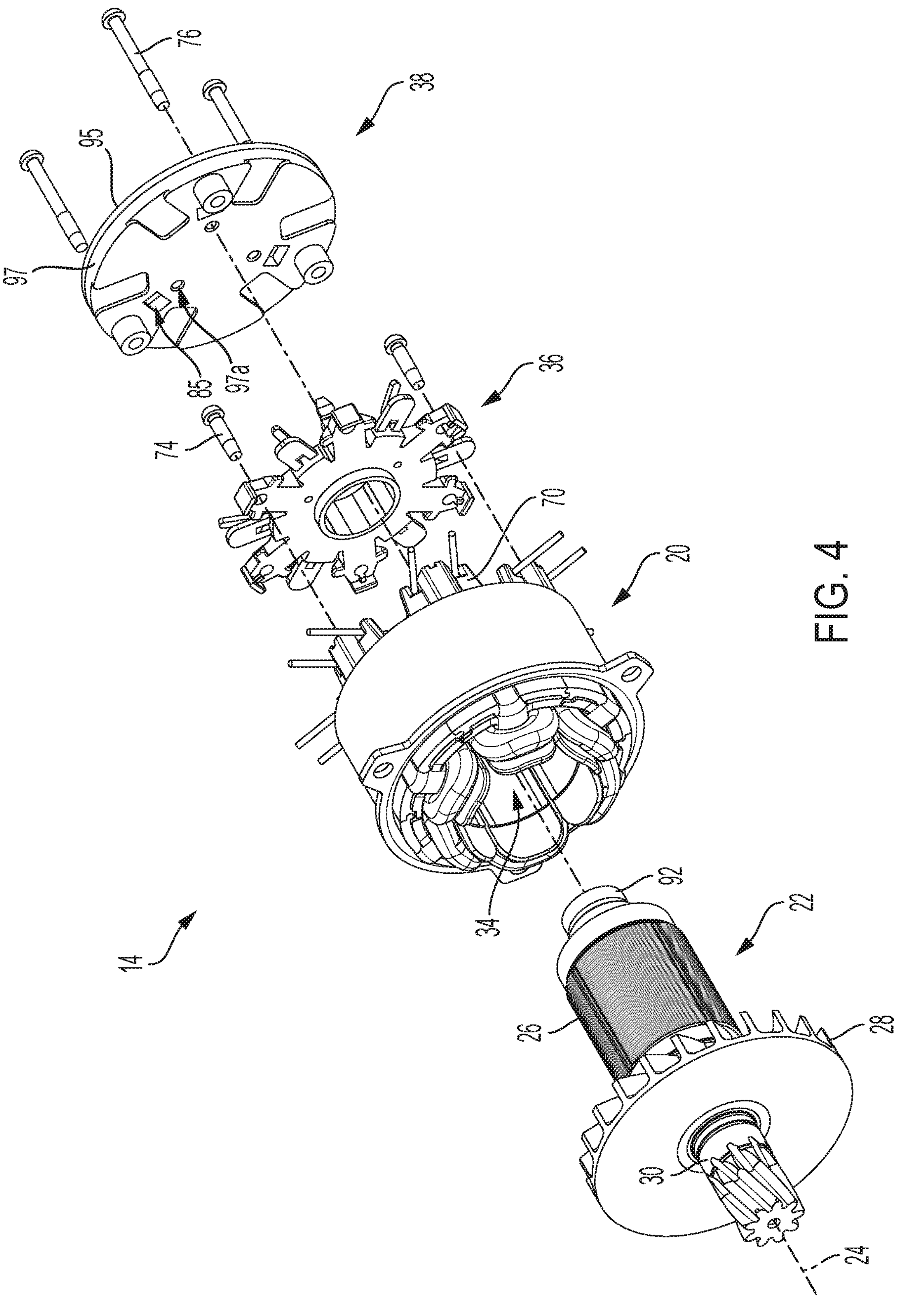
Figure 6:
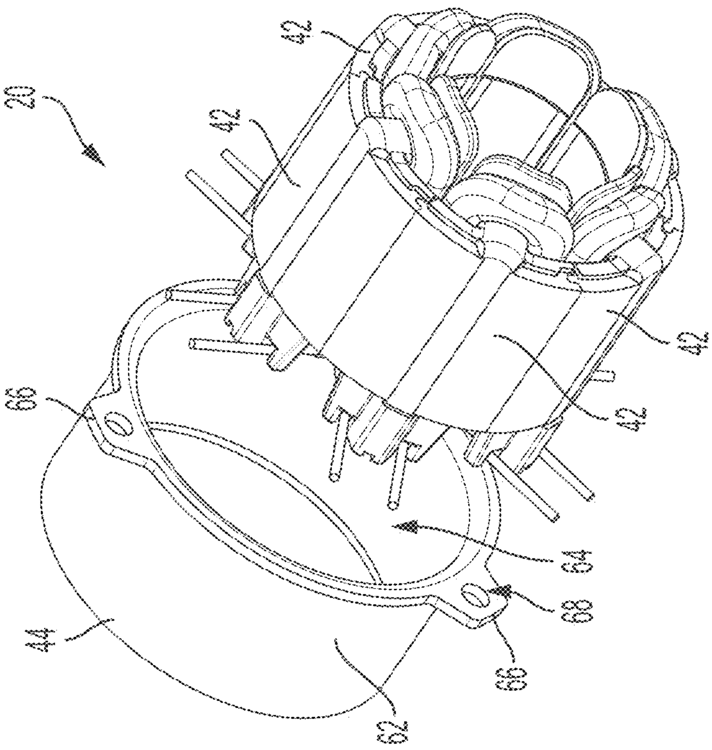
FIG. 6 is a partially exploded perspective view illustrating the stator assembly of FIG. 5.
Figure 5:
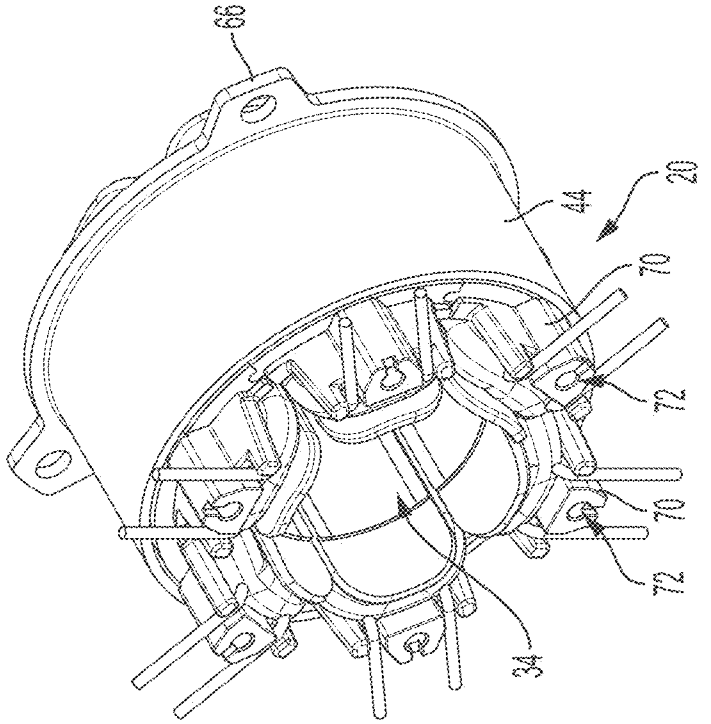
FIG. 5 is a perspective view illustrating a stator assembly of the electric motor of FIG. 2.

With reference to FIGS. 2-4, the illustrated motor 14 is a brushless direct current ("BLDC") motor with a stator assembly 20 and a rotor assembly 22 that is rotatable with respect to the stator assembly 20 about an axis 24. The rotor assembly 22 includes a rotor body 26 and a fan 28 that are each supported on a rotor shaft 30. The fan 28 is located adjacent a first end or front end 32 of the motor 14. The stator assembly 20 includes a central cavity 34 that receives the rotor assembly 22 for rotation about the axis 24. The motor 14 also includes a bus bar assembly 36 and a printed circuit board assembly (PCBA) 38 that are each coupled to the stator assembly 20 at a second end or rear end 40 of the motor 14 opposite the front end 32.

With reference to FIGS. 5-9, the stator assembly 20 is a segmented stator assembly 20 including, in the illustrated embodiment, six stator segments 42 arranged within a tubular housing 44. Each stator segment 42 includes a core 46, a molded insulator 48, and a stator winding 50. Adjacent stator segments 42 are interconnected to each other with a notch and protrusion interlock 52. Specifically, each stator segment 42 includes a longitudinally extending notch 54 provided in a first circumferential end face 56, and a longitudinally extending protrusion 58 protruding from a second circumferential end face 60. The notch 54 of one stator segment 42 receives the protrusion 58 of the adjacent stator segment 42 to align two adjacent stator segments 42.

The tubular housing 44 surrounds the arranged stator segments 42 to fix the stator segments 42 together. Specifically, the tubular housing 44 includes a tubular wall 62 that defines an inner cavity 64, and the stator segments 42 are received into the inner cavity 64 such that the tubular wall 62 converges about the stator segments 42. In one example, the tubular housing 44 can be heated to expand an outside diameter of the tubular wall 62, and then the tubular housing 44 can be pressed onto the stator segments 42. As the tubular housing 44 cools, the tubular wall 62 contracts about the stator segments 42 to secure the assembly. In the illustrated embodiment, the tubular housing 44 also includes mounting tabs 66 extending radially outward from the tubular wall 62, with each mounting tab 66 defining a mounting aperture 68 configured to receive a fastener (e.g., a screw) for securing the motor 14 to, e.g., a gearcase (not shown).

Figure 8:
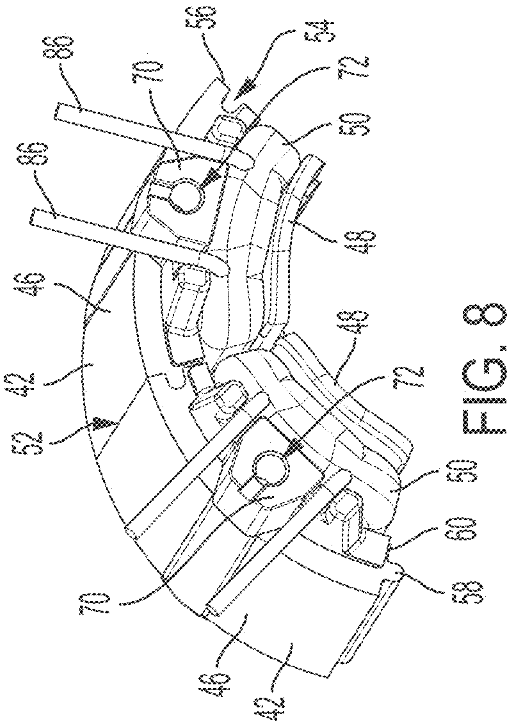
FIGS. 8 and 9 are perspective views illustrating portions of the stator assembly of FIG. 5.
Figure 9:
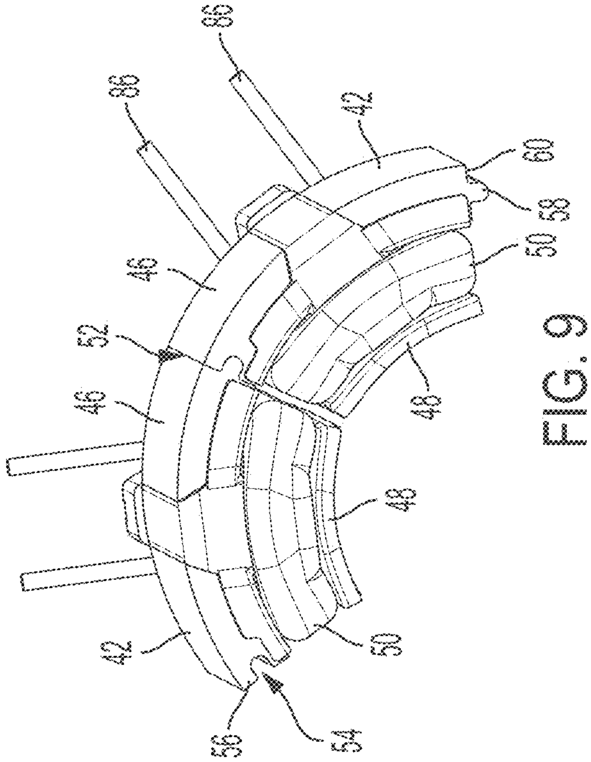
Figure 7:
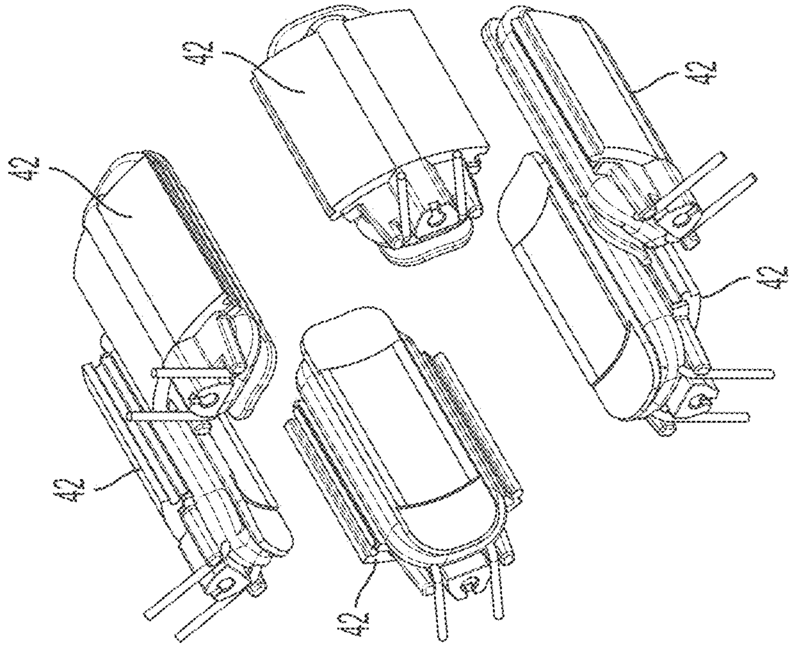
FIG. 7 is a partially exploded perspective view illustrating the stator assembly of FIG. 5 with portions removed.

With reference to FIG. 8, each molded insulator 48 includes a mounting portion 70 protruding toward the rear end 40 of the motor 14. Each mounting portion 70 defines an axially extending threaded bore 72 that receives a first fastener 74 or a second fastener 76 to secure the bus bar assembly 36 and the PCBA 38 to the stator assembly 20 (FIGS. 3 and 4).

Figure 11:
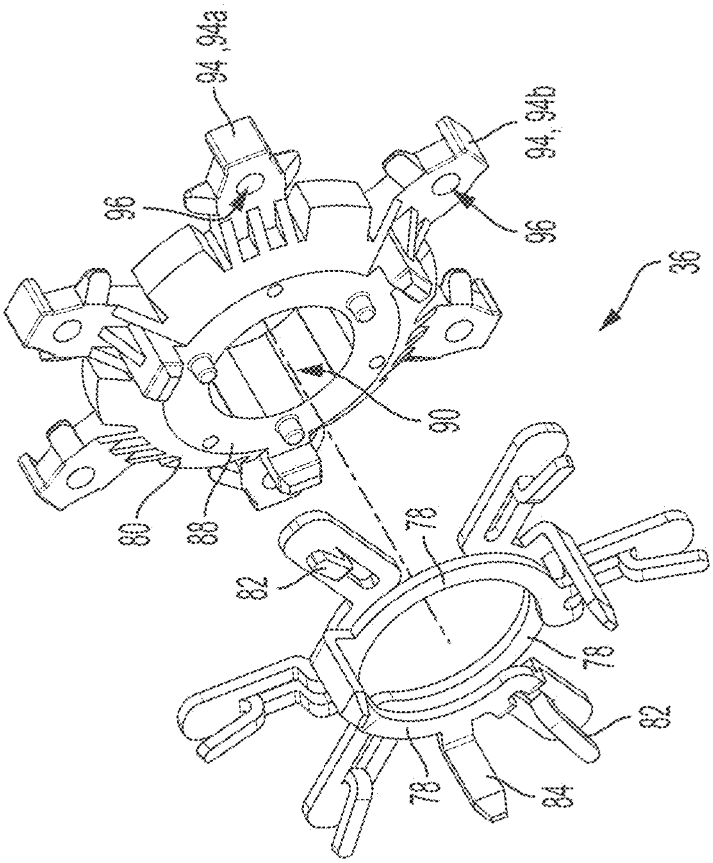
FIG. 11 is an exploded perspective view illustrating the bus bar assembly of FIG. 10.
Figure 10:
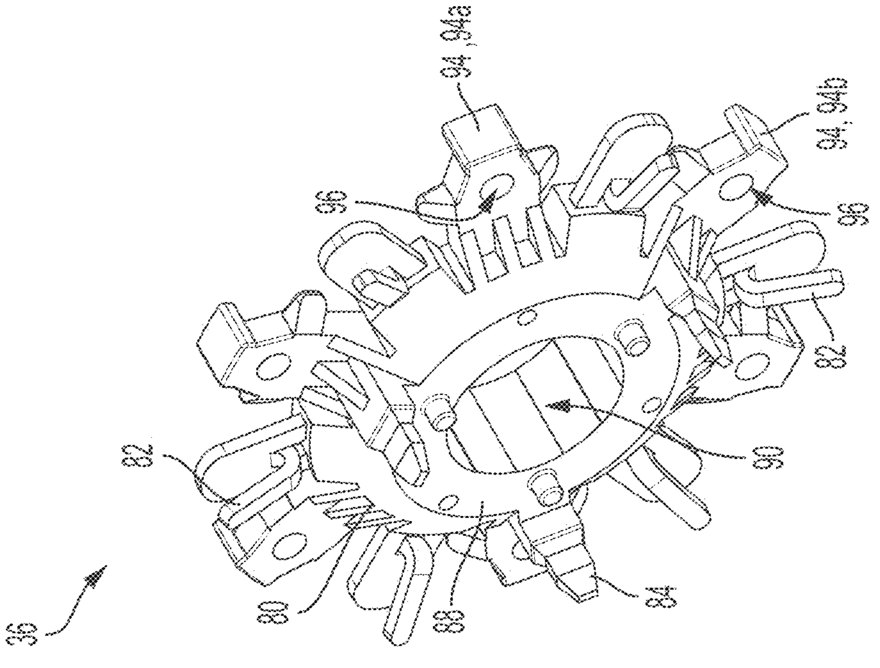
FIG. 10 is a perspective view illustrating a bus bar assembly of the electric motor of FIG. 2.

With reference to FIGS. 10 and 11, the bus bar assembly 36 includes three annular conductors 78 generally extending circumferentially about the motor 14, and a non-conductive body 80 that fixedly supports the conductors 78. Each conductor 78 includes two tangs 82 provided at opposite ends of the conductor 78, and a terminal 84 extending in the axial direction of the motor 14. Each terminal 84 mechanically and electrically connects to the PCBA 38. Specifically, the PCBA 38 includes a plurality of apertures 85 (FIGS. 3 and 12) corresponding to the locations of the terminals 84. During assembly, the terminals 84 are inserted into the apertures 85 and soldered to the PCBA 38 to mechanically and electrically connect the terminals 84 to the PCBA 38. Each stator winding 50 includes a pair of leads 86 (FIG. 8) that connect to the adjacent tangs 82 of the conductors 78. The leads 86 can be soldered or fused to the tangs 82. In this way, the conductors 78 electrically connect the stator windings 50 to the PCBA 38. The PCBA 38 receives power from the battery pack 16 and selectively applies electrical current to the windings 50 to thereby cause the rotor shaft 30 to rotate about the axis 24.

Figure 12:
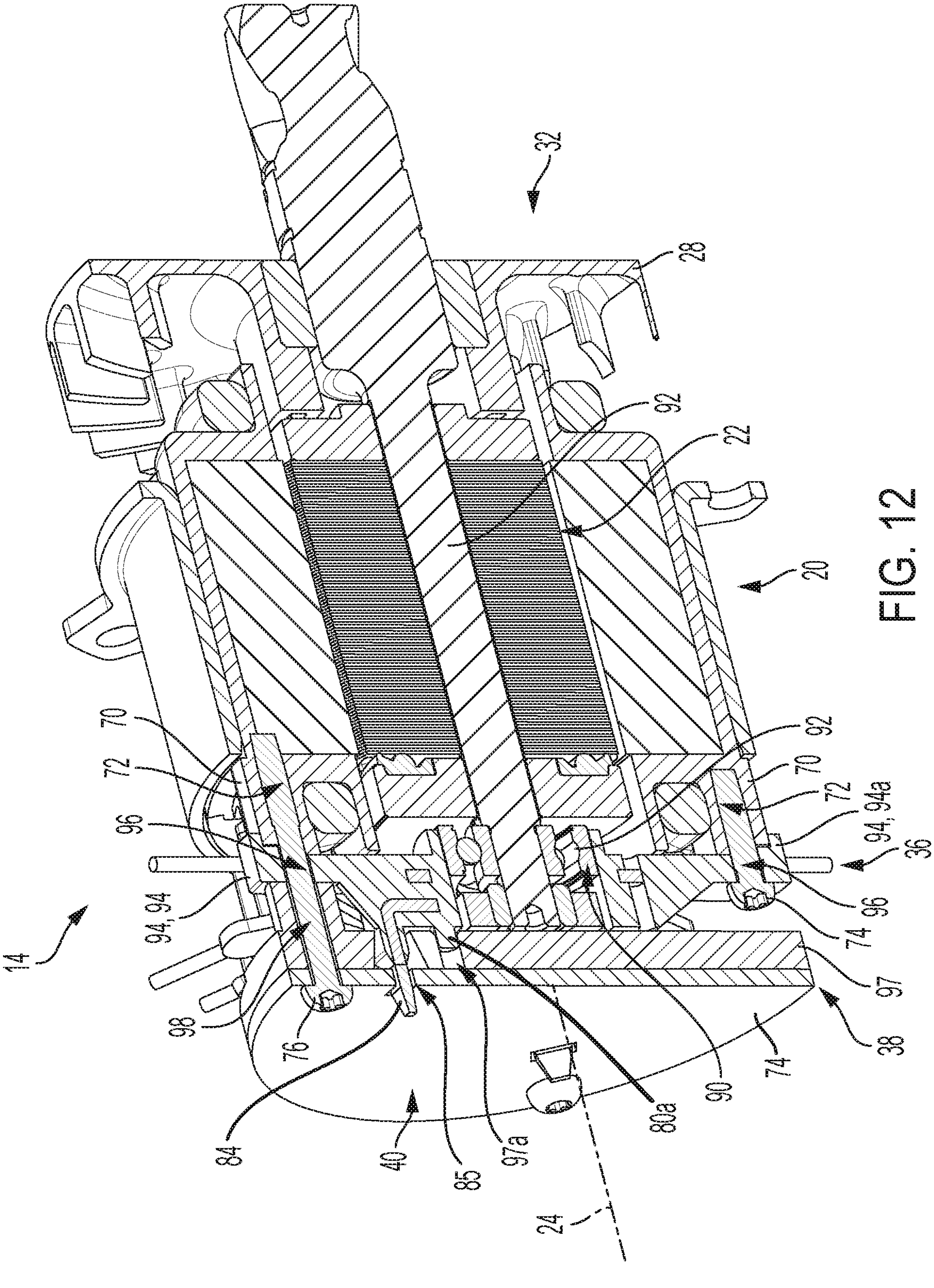
FIG. 12 is a perspective cross-sectional view of the electric motor of FIG. 2, taken along lines 12-12 of FIG. 2.

The non-conductive body 80 includes a central hub 88 that defines a central aperture or bearing pocket 90 that receives and supports a rotor bearing 92 (FIGS. 10-12). The rotor bearing 92 receives the rotor shaft 30 to rotatably support the rotor assembly 22. The non-conductive body 80 further includes radial arms 94 that extend radially outward from the central hub 88. In some embodiments, the number of radial arms 94 corresponds to the number of mounting portions 70 of the stator assembly 20. In the illustrated embodiment, the non-conductive body includes six radial arms 94 that correspond to the six mounting portions 70 of the six stator segments 42. Each radial arm 94 defines a first aperture 96 that aligns with the threaded bore 72 of the corresponding mounting portion 70.

With reference to FIGS. 3 and 12, the bus bar assembly 36 is secured to the mounting portions 70 of the stator assembly 20 by the first fasteners 74 and the second fasteners 76, and the PCBA 38 is secured to the stator assembly 20 by the second fasteners 76. The PCBA 38 includes second apertures 98 extending through the PCBA 38 and corresponding to the first apertures 96 of every other radial arm 94 in the circumferential direction. Thus, the radial arms 94 include first radial arms **94*a* and second radial arms 94*b*. The first radial arms 94*a* are coupled directly to the mounting portions 70 by the first fasteners 74. The second radial arms 94*b* are coupled to both the mounting portions 70 and the PCBA 38 by the second fasteners 76. More specifically, the first fasteners 74 are received through the first apertures 96 of the first radial arms 94*a* and tighten into the threaded bores 72 to secure the first radial arms 94*a* to the mounting portions 70. The second fasteners 76 are received through the second apertures 98 of the PCBA 38 and through the first apertures 96 of the second radial arms 94*b*, and tighten into the threaded bores to secure both the PCBA 38 and the second radial arms 94 to the mounting portions 70. As such, the bus bar assembly 36 is secured to each mounting portion 70 of each stator segment 42, and supports the rotor bearing 92 to center the rotor assembly 22 with respect to the stator assembly 20**.

With reference to FIGS. 3, 4, and 12, the PCBA 38 includes a printed circuit board (PCB) 95 and a heat sink 97 secured to the PCB 95. The heat sink 97 includes a plurality of recesses **97*a*, and the non-conductive body 80 includes a plurality of axially extending protrusions 80*a* that are received within the corresponding recesses 97*a* to align the PCBA 38 with the bus bar assembly 36**.

FIGS. 13-16 illustrate a stator assembly 120 according to another embodiment of the disclosure. The stator assembly 120 is similar to the stator assembly 20 described above and includes much of the same structure as the stator assembly 20. And, the stator assembly 120 is operable with each the rotor assembly 22, the bus bar assembly 36, and the PCBA 38 described above. Features and elements of the stator assembly 120 that are similar to the features and elements of the stator assembly 20 are assigned the same reference numerals "plus 100." It should be understood that the features of the stator assembly 120 that are not explicitly described below have the same properties as the features of the stator assembly 20.

Figure 13:
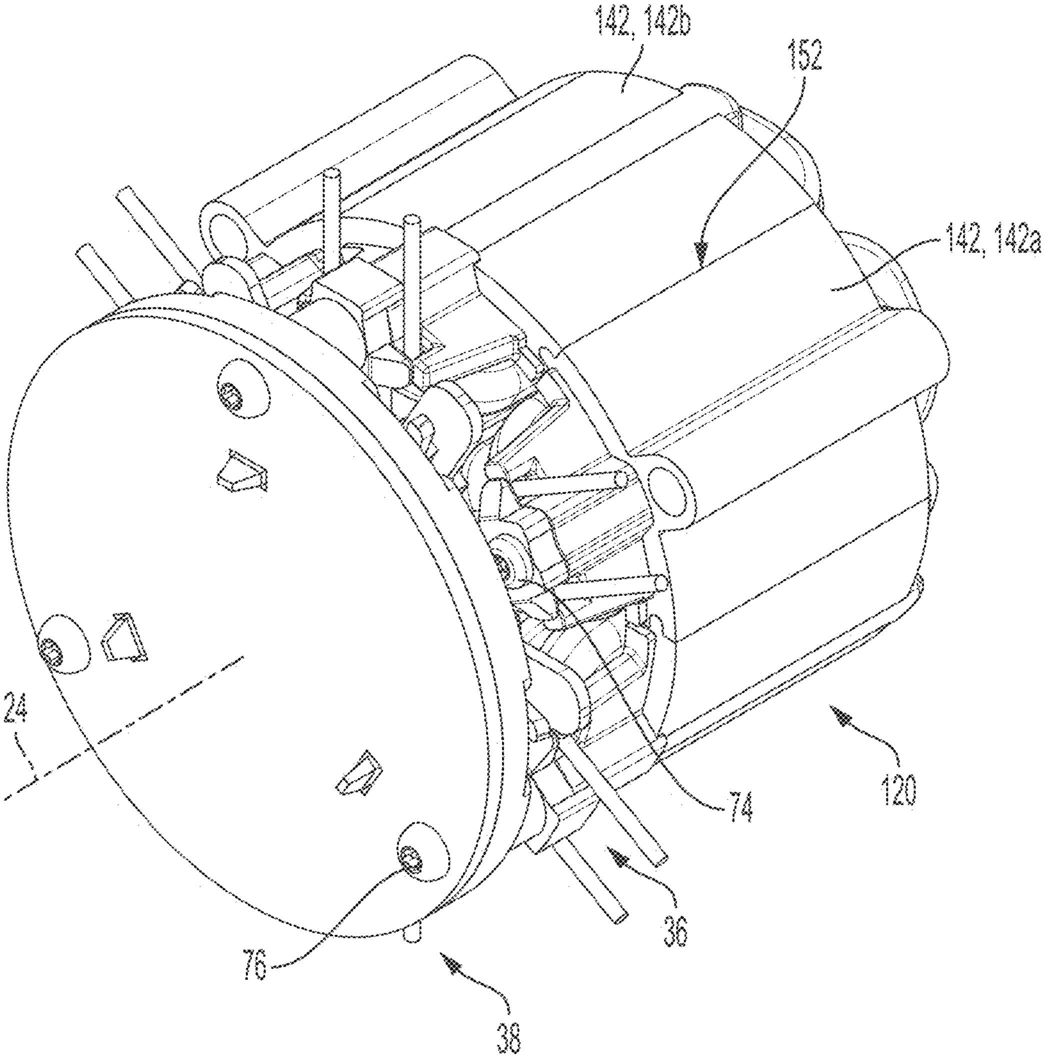
FIG. 13 is a perspective view of a stator assembly according to another embodiment.
Figure 14:
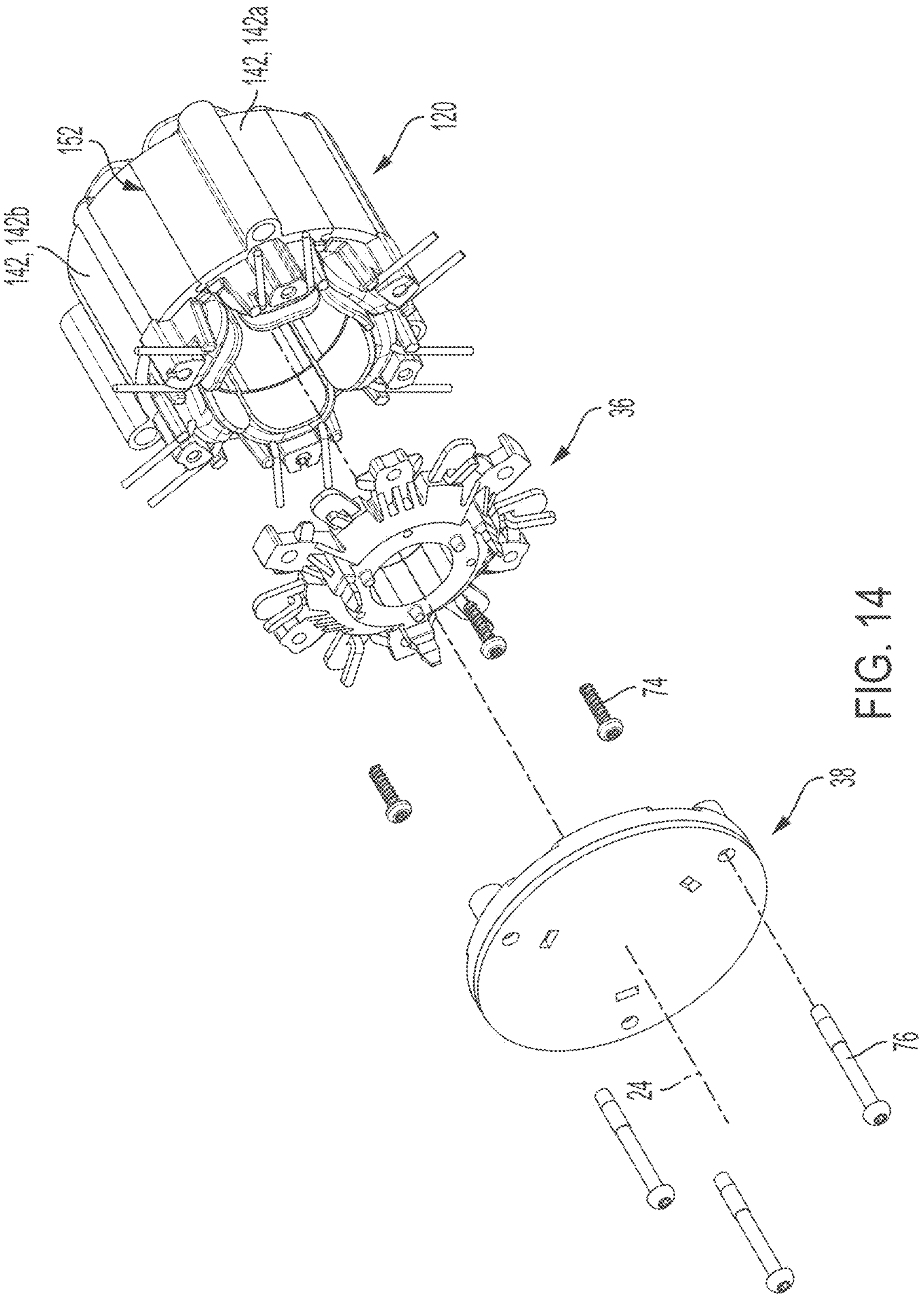
FIG. 14 is an exploded perspective view of the stator assembly of FIG. 13.
Figure 15:
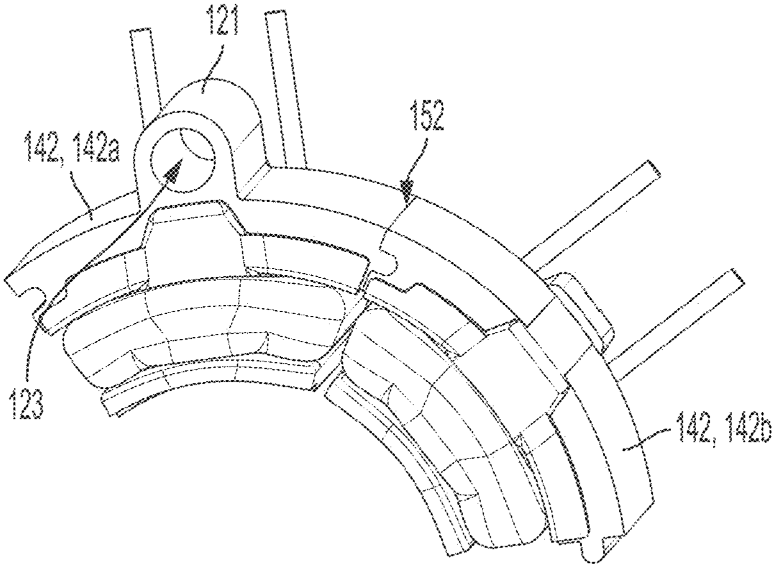
FIGS. 15 and 16 are perspective views of portions of the stator assembly of FIG. 13.
Figure 16:
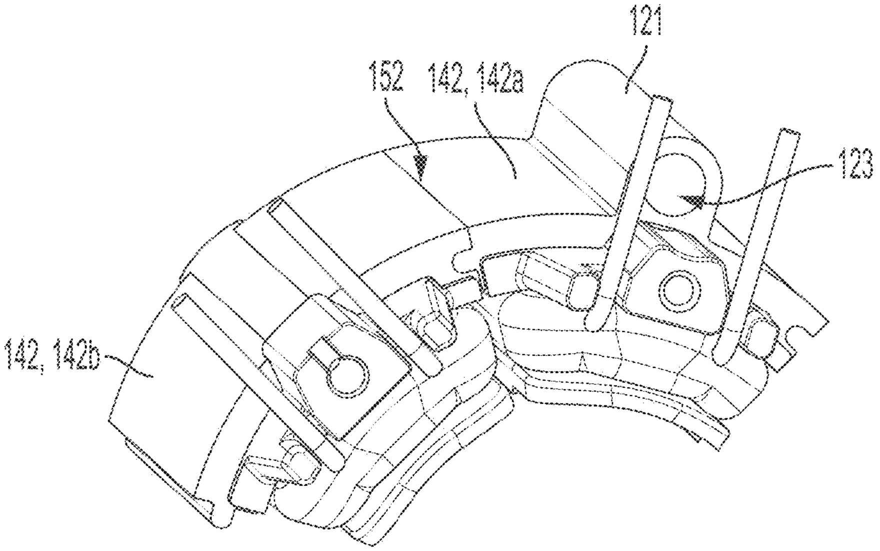
Figure 17:
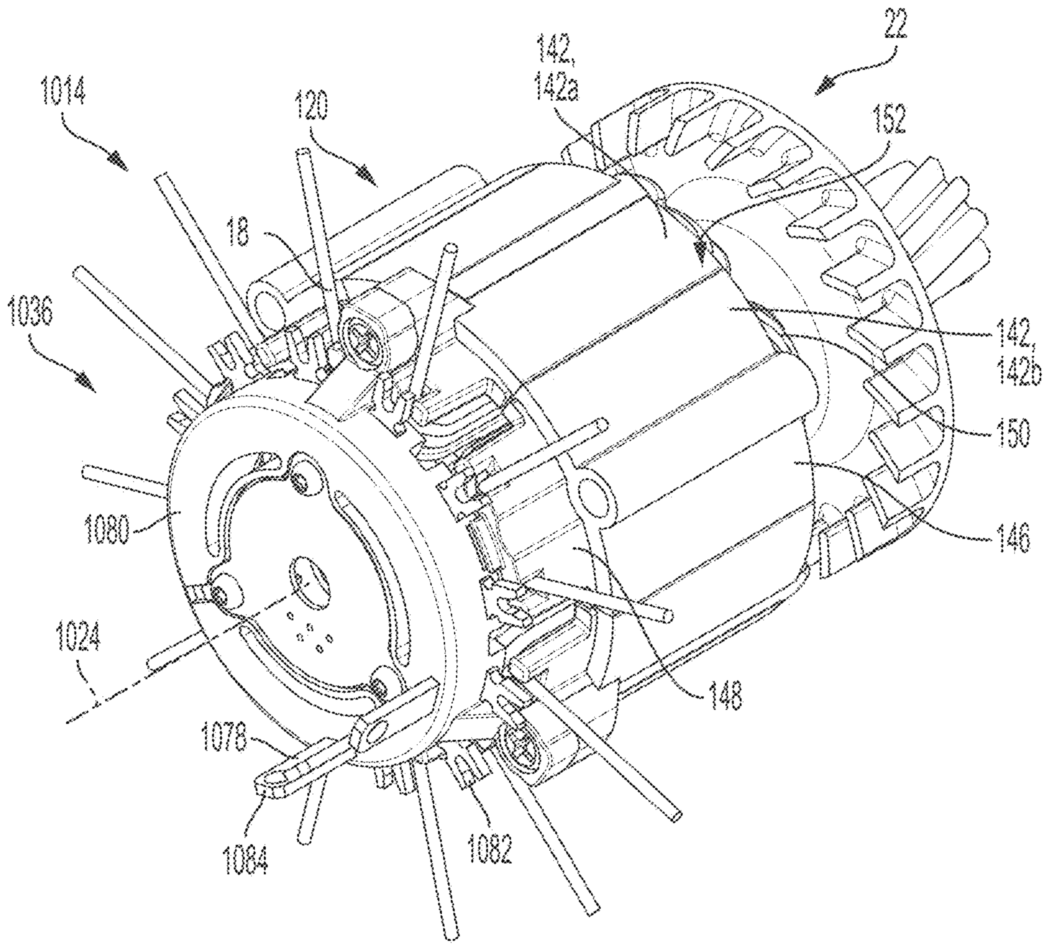
FIG. 17 is a perspective view of portions of an electric motor according to another embodiment.
Figure 18:
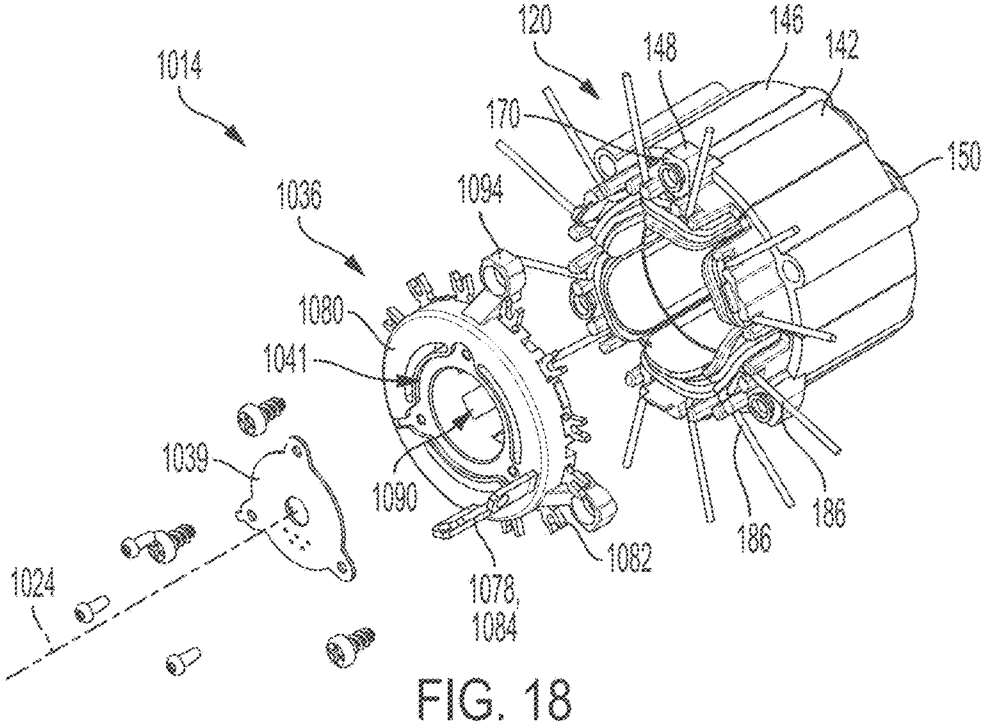
FIG. 18 is a partially exploded perspective view of the electric motor of FIG. 17.

With reference to FIGS. 13 and 14, the stator assembly 120 couples to the bus bar assembly 36 and the PCBA 38 via the first fasteners 74 and the second fasteners 76 in the same manner as described above in connection with the stator assembly 20. And, the stator assembly 120 similarly includes stator segments 142 arranged end to end. However, the stator assembly 120 does not include a tubular housing. Instead, the stator segments 142 are laser welded at notch and protrusion interlocks 152 to secure the stator segments 142 together. Moreover, the stator segments 142 are not uniform, but instead include first stator segments 142*a* and second stator segments 142*b* arranged in an alternating order (FIGS. 15 and 16). More specifically, each first stator segment 142*a* is connected to a second stator segment 142*b* at each circumferential end. The first stator segments 142*a* each include a mounting rib 121 protruding radially outward and extending lengthwise in the axial direction. Each mounting rib 121 defines a mounting aperture 123 that receives a fastener for mounting the stator assembly 120 to, e.g., a gearcase (not shown). The second stator segments 142*b* do not include mounting ribs, but do include axially extending grooves that receive a portion of the molded insulator 148.

FIGS. 17-22 illustrate all or portions of an electric motor 1014 according to another embodiment of the disclosure. The motor 1014 includes the segmented stator assembly 120 described herein in connection with FIGS. 13-16, and is operable with the rotor assembly 22 described herein in connection with FIGS. 2-4 and 12.

The motor 1014 includes a bus bar assembly 1036 that couples to an axial end of the stator assembly 120. The bus bar assembly 1036 includes three annular conductors 1078 (FIGS. 21-22) and a non-conductive body 1080 that fixedly supports the conductors 1078. Each conductor 1078 includes four winding connection terminals or tangs 1082 provided at two opposite ends of the conductor 1078, and a power connection terminal 1084 protruding from the conductor 1078. The non-conductive body 1080 includes three mounting arms 1094 protruding radially from a central region of the non-conductive body 1080 and spaced at equal intervals about the circumference thereof. The mounting arms 1094 engage mounting portions 170 defined by the molded insulators 148 of the first stator segments 142*a*. The mounting arms 1094 can be secured to the mounting portions 170 via, e.g., threaded fasteners.

Each terminal 1084 electrically connects to a PCBA (e.g., via wires; not shown) that receives power from the battery pack 16 (FIG. 1) and selectively applies electrical current to the stator windings 150. The leads 186 of the windings 150 connect to the two adjacent tangs 1082 of the conductors 1078. In this way, the conductors 1078 electrically connect the stator windings 150 to the PCBA.

The non-conductive body 1080 defines a central aperture or bearing pocket 1090 that receives the rotor bearing 92 (FIG. 3). The rotor bearing 92 receives the rotor shaft 30 of the rotor assembly 22 (FIG. 3) to rotatably support the rotor assembly 22. Since the bus bar assembly 1036 is secured to each mounting portion 170 of each stator segment 142*a*, and further supports the rotor bearing 92, the bus bar assembly 1036 centers the rotor assembly 22 with respect to the stator assembly 120.

A printed circuit board assembly (PCBA) 1039, such as a rotor position sensor circuit board, is coupled to the non-conductive body 1080 of the bus bar assembly 1036. The PCBA 1039 is generally annular in shape and received into a corresponding centrally located, annularly shaped recess 1041 defined in the non-conductive body 1080 and secured thereto by threaded fasteners. The PCBA 1039 covers at least a portion of the bearing pocket 1090.

Figure 19:
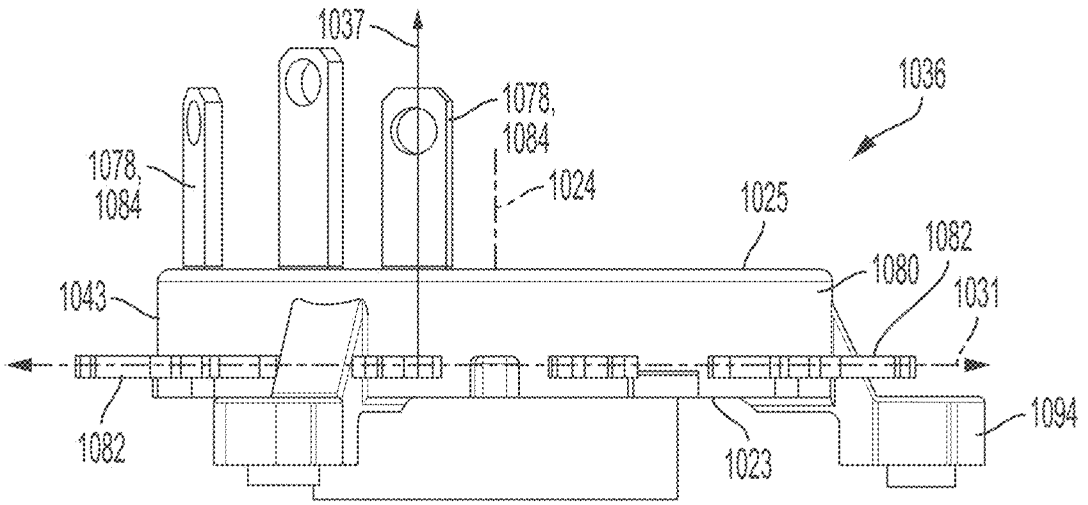
FIG. 19 is a side view illustrating a bus bar assembly of the electric motor of FIG. 17.
Figure 20:
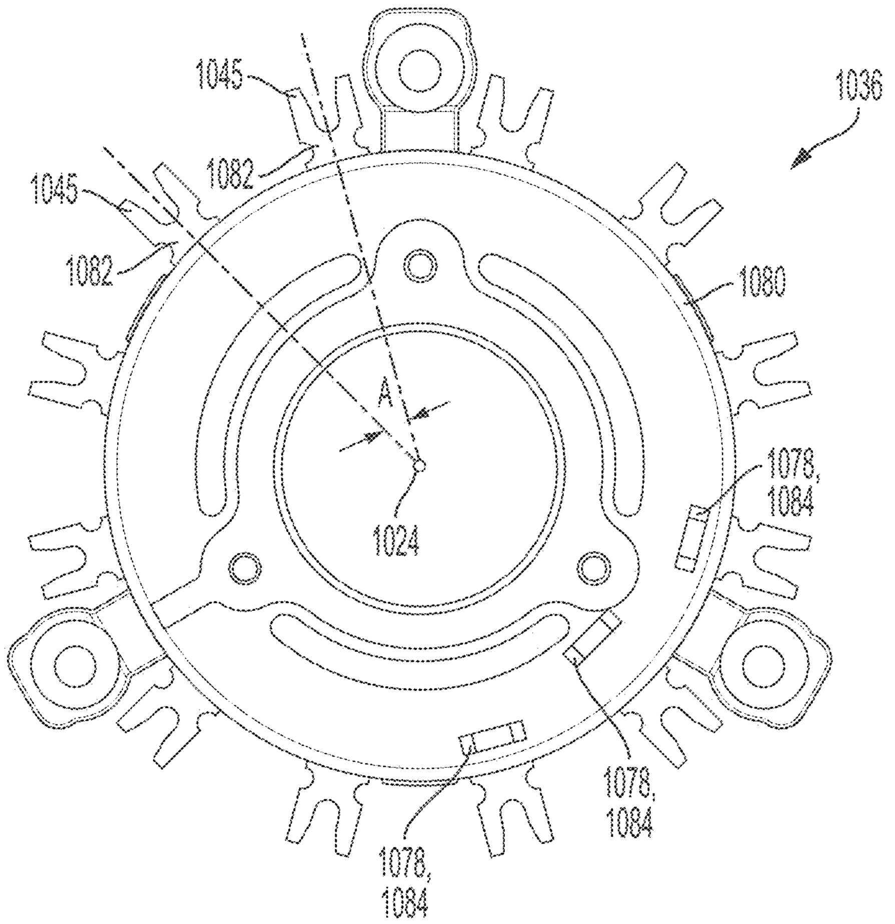
FIG. 20 is a plan view of the bus bar assembly of FIG. 19.
Figure 21:
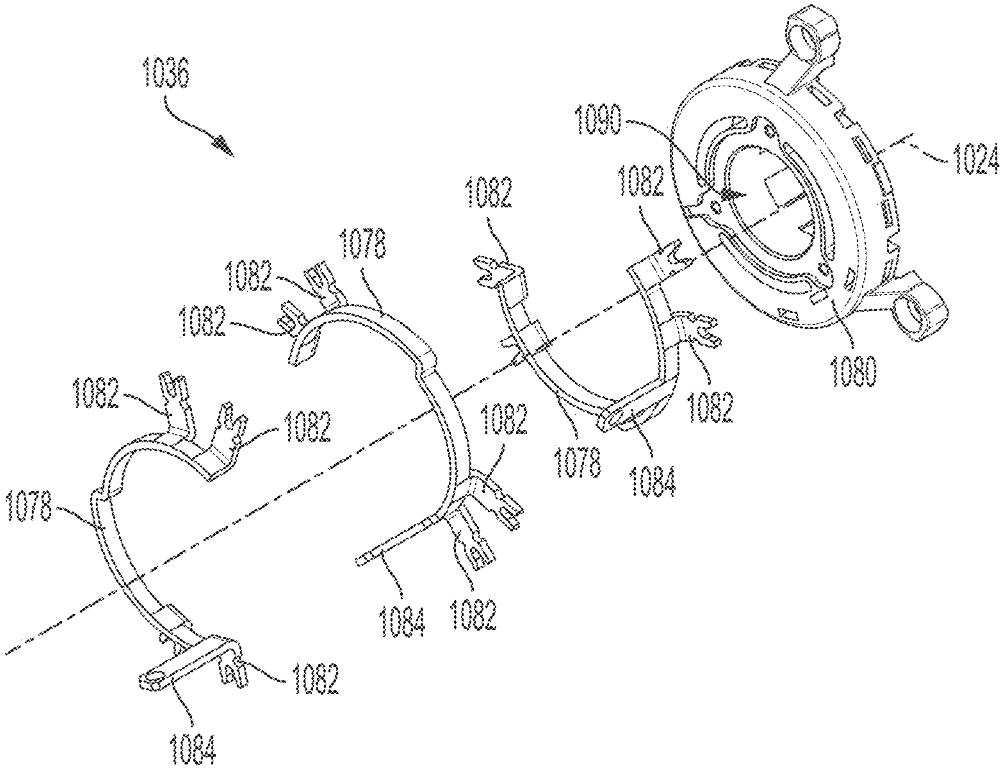
FIG. 21 is an exploded perspective view of the bus bar assembly of FIG. 19.
Figure 22:
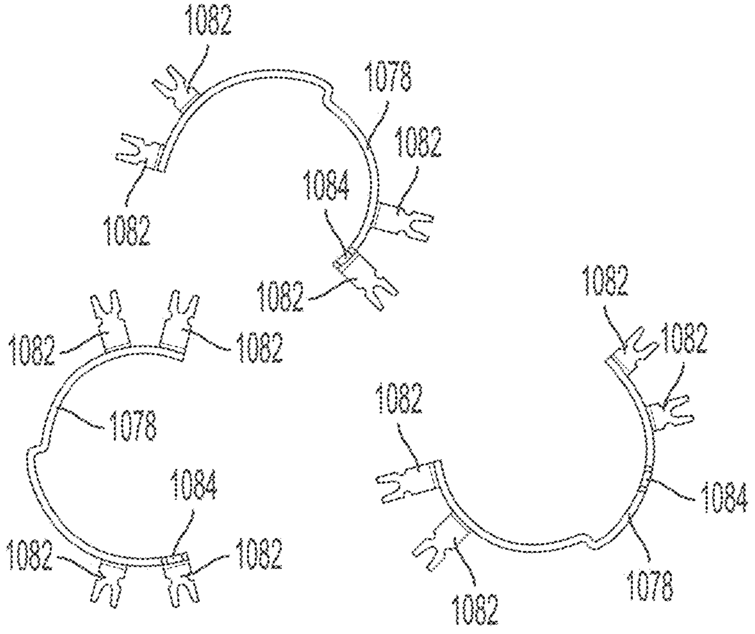
FIG. 22 is an exploded plan view of the bus bar assembly of FIG. 19 with portions removed.

As shown in FIG. 19, the non-conductive body 1080 includes a first axial surface 1023 extending at a first axial end thereof and a second axial surface 1025 extending at a second axial end thereof. The first axial surface 1023 faces toward the stator assembly 120 and the second axial surface 1025 faces away from the stator assembly 120. The non-conductive body 1080 also includes a circumferential outer surface 1043 that extends between the first and second axial surfaces 1023, 1025. The tangs 1082 each protrude from the circumferential outer surface 1043 generally in the radial direction. Each tang 1082 includes a forked tip 1045 at its distal end and is generally planar in shape. The corresponding lead 186 (FIG. 17) of the adjacent stator winding 150 is received by and contacts the forked tip 1045 and is mechanically attached thereto by, e.g., laser welding. In other embodiments, the leads 186 can be attached to the forked tips 1045 by other means, such as soldering, ultrasonic welding, crimping, and the like. As further shown in FIG. 19, each of the tangs 1082 are also generally located within the same axial region of the motor 1014. In particular, each tang 1082 lies within and defines a first plane 1031 that extends perpendicular to the central axis 1024. As shown in FIG. 20, the tangs 1082 are spaced at generally equal intervals about the circumference of the non-conductive body 1080. As such, an angle A is measured on center about the central axis 1024 between any two adjacent tangs 1082. In the illustrated embodiment, the bus bar assembly 1036 includes twelve tangs 1082 and the angle A is approximately 30 degrees.

In the illustrated embodiment, the bus bar assembly 1036 includes three power connection terminals 1084 that protrude from the second axial surface 1025 of the non-conductive body 1080 in an axial direction 1037. Each terminal 1084 is formed as a straight leg oriented perpendicular to the central axis 1024. All of the terminals 1084 extend generally parallel to one another and perpendicular to the first plane 1031.

The bus bar assembly 1036 is configured to provide a parallel delta winding configuration for the motor 1014. Specifically, when the leads 186 of the windings 150 forming each coil are connected to the corresponding forked tips 1045 of the respective nearest tangs 1082, the windings 150 are arranged in a parallel delta winding configuration.

In the embodiments of FIGS. 1-22 described herein, the bus bar assemblies 36, 1036 are secured to the stator assemblies 20, 120 by threaded fasteners. FIGS. 23-32 illustrate alternative embodiments of electric motors that are similar to the electric motor 1014 described herein, but which utilize alternative means of securing the bus bar assembly to the stator assembly. The alternative means described in connections with FIGS. 23-32 do not use threaded fasteners.

Figure 23:
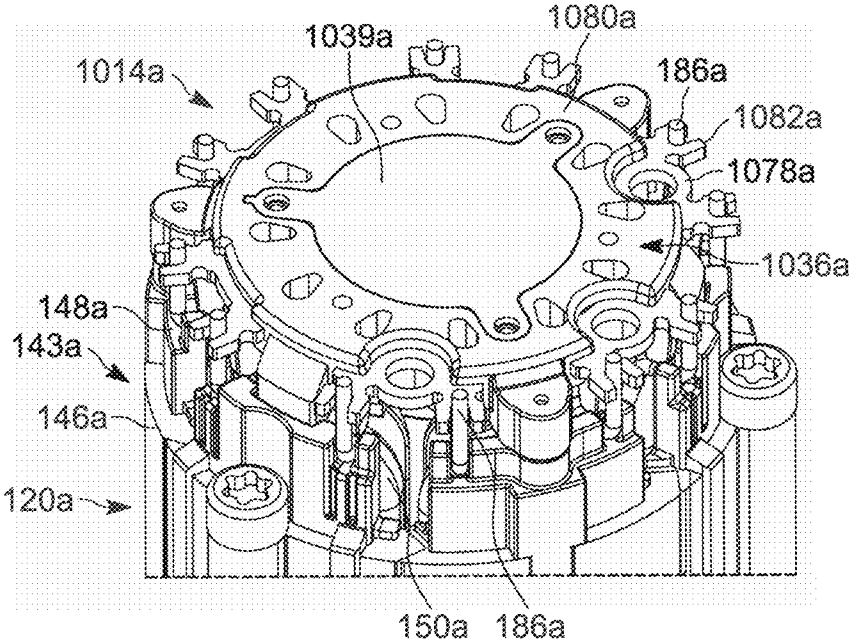
FIGS. 23, 24, 25 illustrate portions of an electric motor according to another embodiment where a bus bar assembly is secured to a stator assembly by an ultrasonic welding method.
Figure 24:
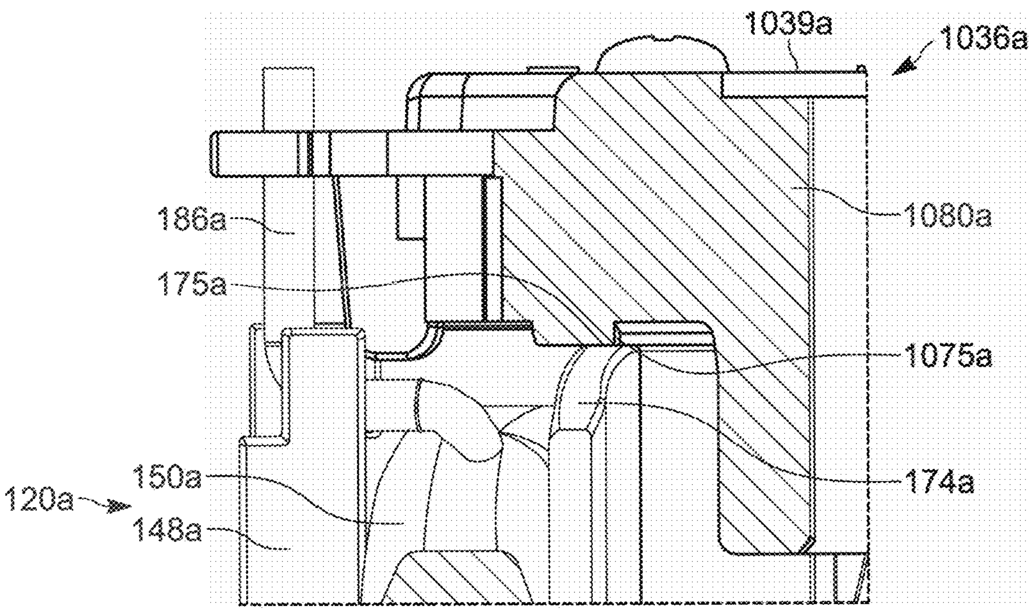
Figure 25:
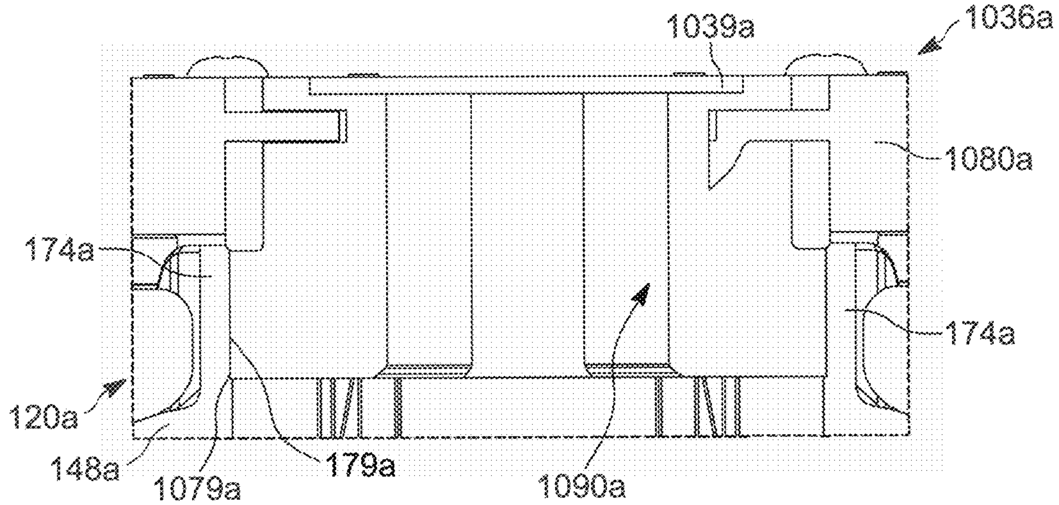

FIGS. 23-25 illustrate portions of an electric motor 1014*a* according to another embodiment of the disclosure. The motor 1014*a* includes a segmented stator assembly 120*a* similar to the segmented stator assembly 120 described herein in connection with FIGS. 13-16. The motor 1014*a* also includes a bus bar assembly 1036*a* similar to the bus bar assembly 1036 described herein in connection with FIGS. 17-22. The bus bar assembly 1036*a* may be secured to the stator assembly 120*a* by an ultrasonic welding process as will be described herein. The electric motor 1014*a* is operable with and may include the rotor assembly 22 described herein in connection with FIGS. 2-4 and 12.

The stator assembly 120*a* is a segmented stator assembly 120*a* including, in the illustrated embodiment, six stator segments 143*a* secured to one another at their circumferential ends. Each stator segment 143*a* includes a core 146*a*, a molded insulator 148*a* affixed to the core 146*a* (e.g., formed of resin via injection molding), and a stator winding 150*a*. In other embodiments (not shown), the stator assembly may not be segmented, but instead may include a unitary annular core and a unitary insulator, while still utilizing the ultrasonic welding process to attach the bus bar assembly 1036*a* as described herein.

In the illustrated embodiment, the bus bar assembly 1036*a* includes a plurality of conductors 1078*a* with radially protruding winding connection terminals or tangs 1082*a*. Each stator winding 150*a* includes a pair of leads 186*a* that connect to the adjacent tangs 1082*a*. The bus bar assembly 1036*a* also includes a non-conductive body 1080*a* (e.g., formed of resin) that fixedly supports the conductors 1078*a*. A PCBA 1039*a*, such as a rotor position sensor circuit board, is coupled to the non-conductive body 1080*a*. The non-conductive body 1080*a* further defines a central aperture or bearing pocket (e.g., such as bearing pocket 1090*a*, FIG. 25) that receives a rotor bearing 92 (FIGS. 10-12).

FIG. 24 shows a portion of the bus bar assembly 1036*a* secured to the stator assembly 120*a* by ultrasonic welding. Specifically, the molded insulator 148*a* may be formed from a first thermoplastic material and the non-conductive body 1080*a* may also be formed of a second thermoplastic material. The first and second thermoplastic materials may be the same or different. Each of the first and second thermoplastic materials may experience melting when heated above their respective melt temperatures and may bond to one another when cooled. During the ultrasonic welding process, the parts are vibrated at high frequencies to generate heat that locally melts and fuses the parts together at the contacting surfaces 175*a*, 1075*a*. An ultrasonic weld is formed where a bottom or inboard surface 1075*a* of the non-conductive body 26 contacts an axially outer surface 175*a* of a coil protector portion 174*a* of the molded insulator 148*a*.

FIG. 25 shows a second example of ultrasonic welding where the ultrasonic welds are formed at different locations. Specifically, the welds are formed where an outer circumferential surface 1079*a* of the bearing pocket 1090*a* contacts an inner annular surface 179*a* of the coil protection portions 174*a*.

Figure 26:
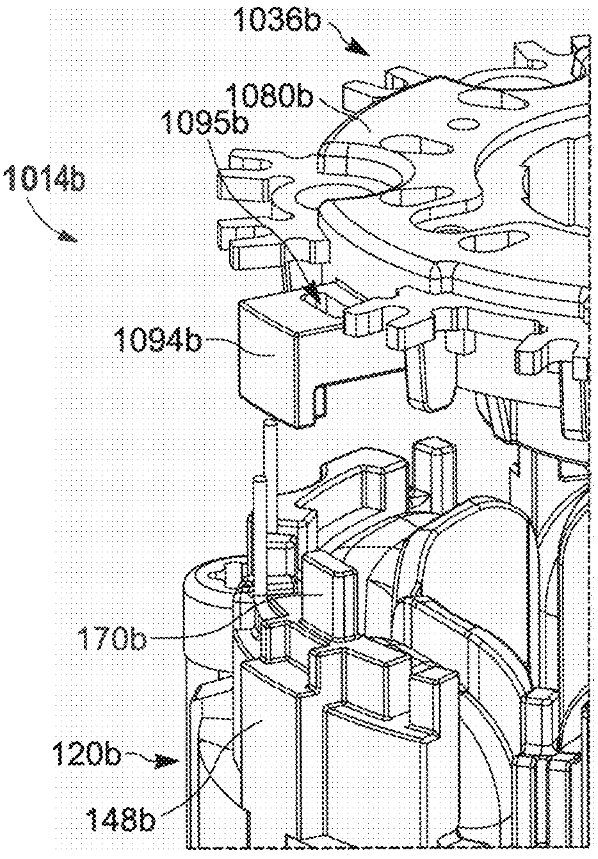
FIGS. 26, 27, 28, 29, 30, 31 illustrate portions of an electric motor according to another embodiment where a bus bar assembly is secured to a stator assembly by a thermal press method.
Figure 27:
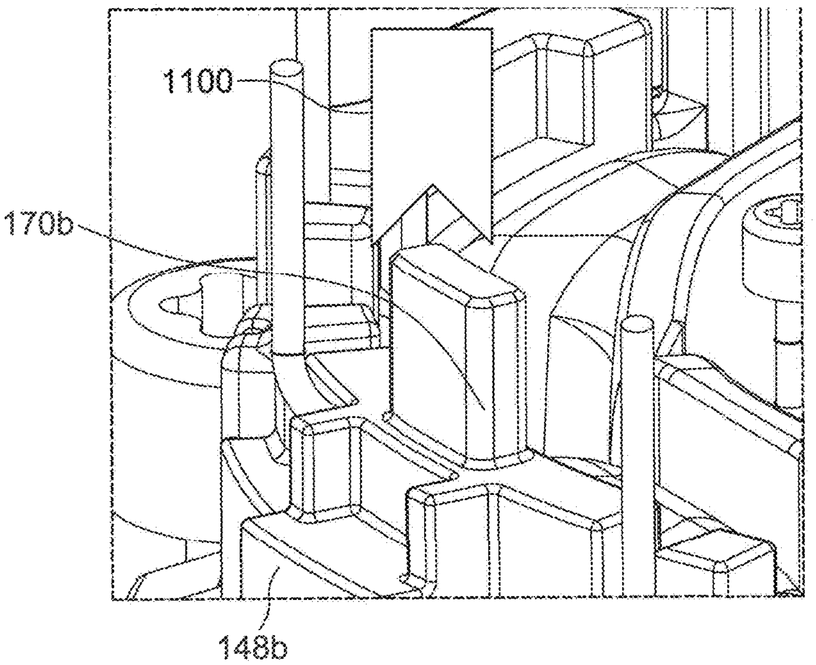
Figure 28:
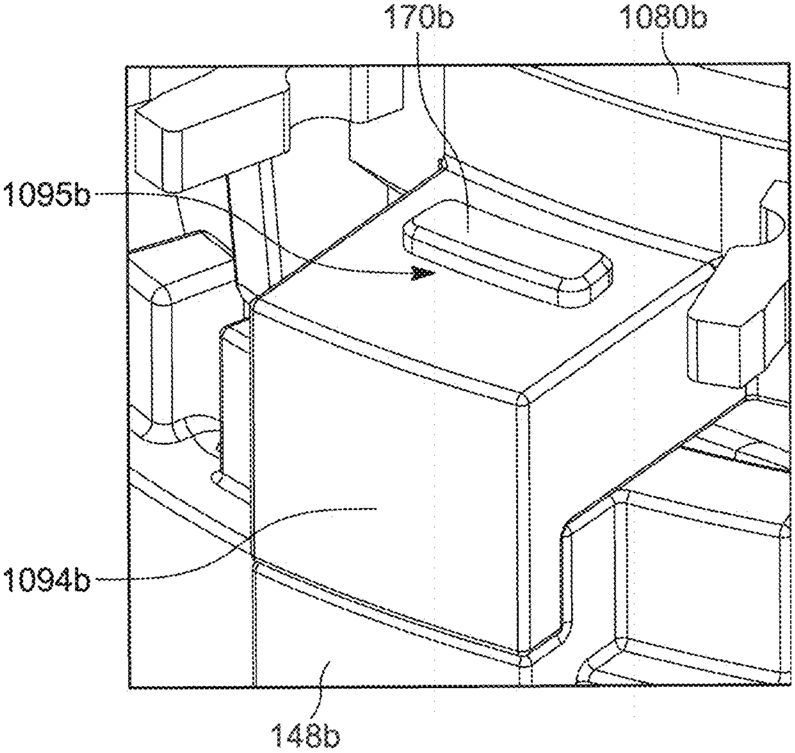

FIGS. 26-28 illustrate portions of an electric motor 1014*b* according to another embodiment of the disclosure. The electric motor 1014*b* is similar in many respects to the electric motor 1014*a* described herein in connection with FIGS. 23-25, and as such, the following description will focus on the differences between the motors 1014*a* and 1014*b*. In this embodiment, a bus bar assembly 1036*b* is secured to a stator assembly 120*b* via a thermal press method. A molded insulator 148*b* of the stator assembly 120*b* includes a plurality of elongated, axially protruding posts 170*b*. A non-conductive body 1080*b* of the bus bar assembly 1036*b* includes a plurality of radially protruding tabs or radial arms 1094*b* that each define receptacles configured as slot-shaped apertures 1095*b* shaped and sized to closely receive the posts 170*b*. At least the posts 170*b* may be formed from a first thermoplastic material and the receptacles or apertures 1095*b* may be defined by a second thermoplastic material. The first and second thermoplastic materials may be the same or different. Each of the first and second thermoplastic materials may experience melting when heated above their respective melt temperatures and may bond to one another when cooled. In the illustrated embodiment, the insulator 148*b* is formed entirely of the first thermoplastic material and the non-conductive body 1080*b* is formed entirely of the second thermoplastic material.

First, the posts 170*b* are each heated by a thermal tip 1100 (FIG. 27). Once the posts 170*b* reach a predetermined temperature, the thermal tips 1100 are removed and the bus bar assembly 1036*b* is quickly pressed onto the stator assembly 120*b* so that the slot-shaped apertures 1095*b* receive the posts 170*b* by press fit. The heated posts 170*b* bond to the surface of the slot-shaped apertures 1095*b* to form a secure connection. Therefore, the connections formed between the posts 170*b* and the surface of the non-conductive body 1080*b* defining the slot-shaped apertures 1095*b* secure the non-conductive body 1080*b* to the molded insulator 148*b*. In the illustrated embodiment, the posts 170*b* extend entirely through the apertures 1095*b* from a first axially facing surface of the non-conductive body 1080*b* to an opposite, second axially facing surface of the non-conductive body 1080*b*. In some embodiments, distal ends of the posts 170*b* protrude beyond the aperture 1095*b* and beyond the second axially facing surface.

In other embodiments of the electric motor 1014*b*, the insulator 148*b* may instead define the receptacles, or slot-shaped apertures, and the non-conductive body 1080*b* may correspondingly include the posts. The same is generally true for the following description of the electric motors 1014*c* and 1014*e*, i.e., the posts and corresponding receptacles may be formed by the insulator and the non-conductive body, or vice versa.

Figure 29:
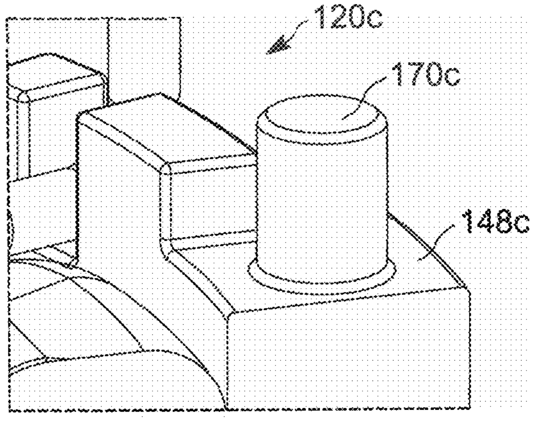
Figure 30:
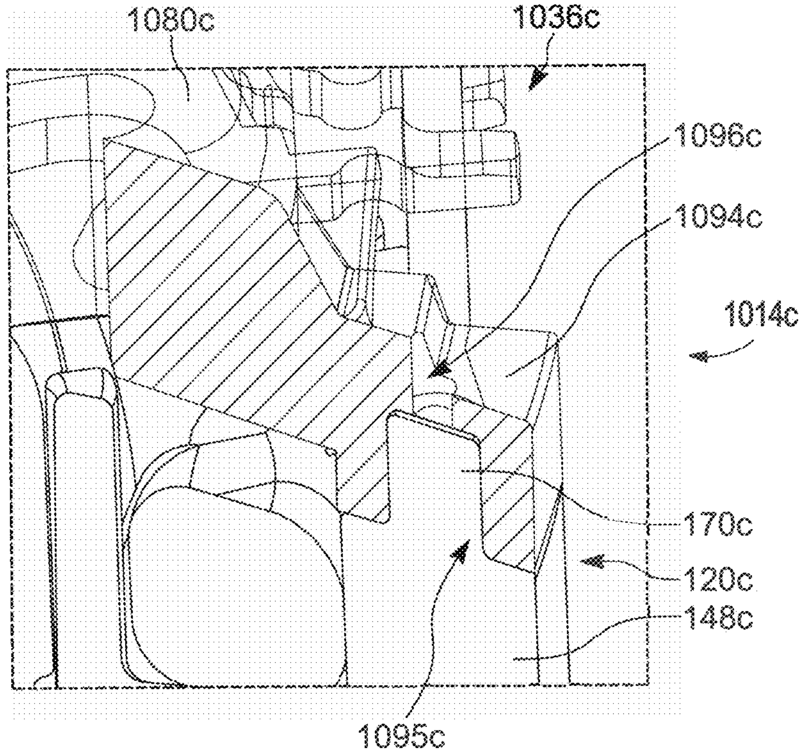
Figure 31:
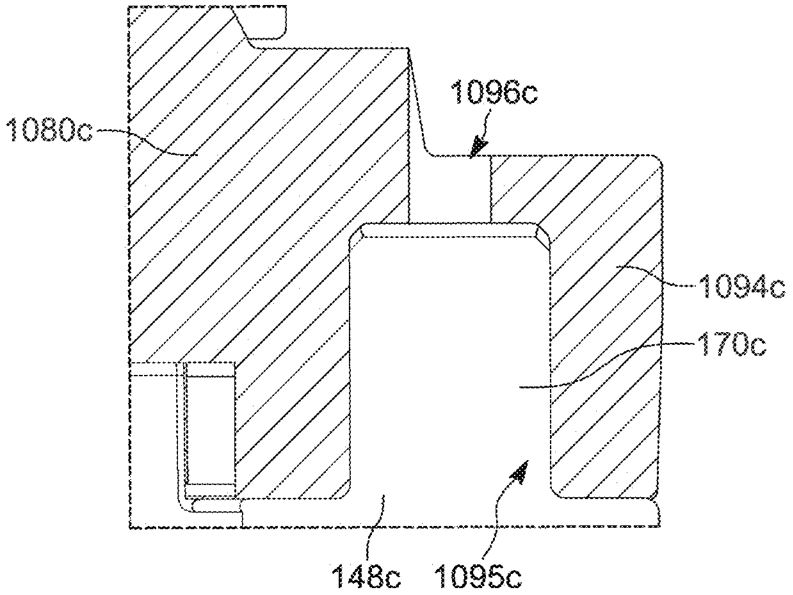

FIGS. 29-31 illustrate portions of an electric motor 1014*c* according to another embodiment of the disclosure. The electric motor 1014*c* is similar in many respects to the electric motor 1014*b* described herein in connection with FIGS. 26-28, and as such, the following description will focus on the differences between the motors 1014*b* and 1014*c*. In this embodiment, a bus bar assembly 1036*c* is secured to a stator assembly 120*c* via a thermal press method, but the shapes of the posts and radial arms differ from those shown in FIGS. 26-28. A molded insulator 148*c* of the stator assembly 120*c* includes axially protruding cylindrical posts 170*c*, and a non-conductive body 1080*c* of the bus bar assembly 1036*c* includes radial arms 1094*c* that each define receptacles configured as cylindrical recesses 1095*c* that extend only partially through the radial arms 1094*c* in the axial direction. The cylindrical posts 170*c* are thermally pressed into the recesses 1095*c* in a manner similar to that described herein in connection with FIGS. 26-28. However, the radial arms 1094*c* also include relief apertures 1096*c* that communicate with the recesses 1095*c* on an axially outer side of the radial arms 1094*c*. The relief apertures 1096*c* provide a relief area for material displacement of the posts 170*c* during the thermal press process. The relief aperture 1096*c* has a smaller diameter than that of the recess 1095*c*, and a shoulder is defined between the recess 1095*c* and the relief aperture 1096*c*.

Figure 32:
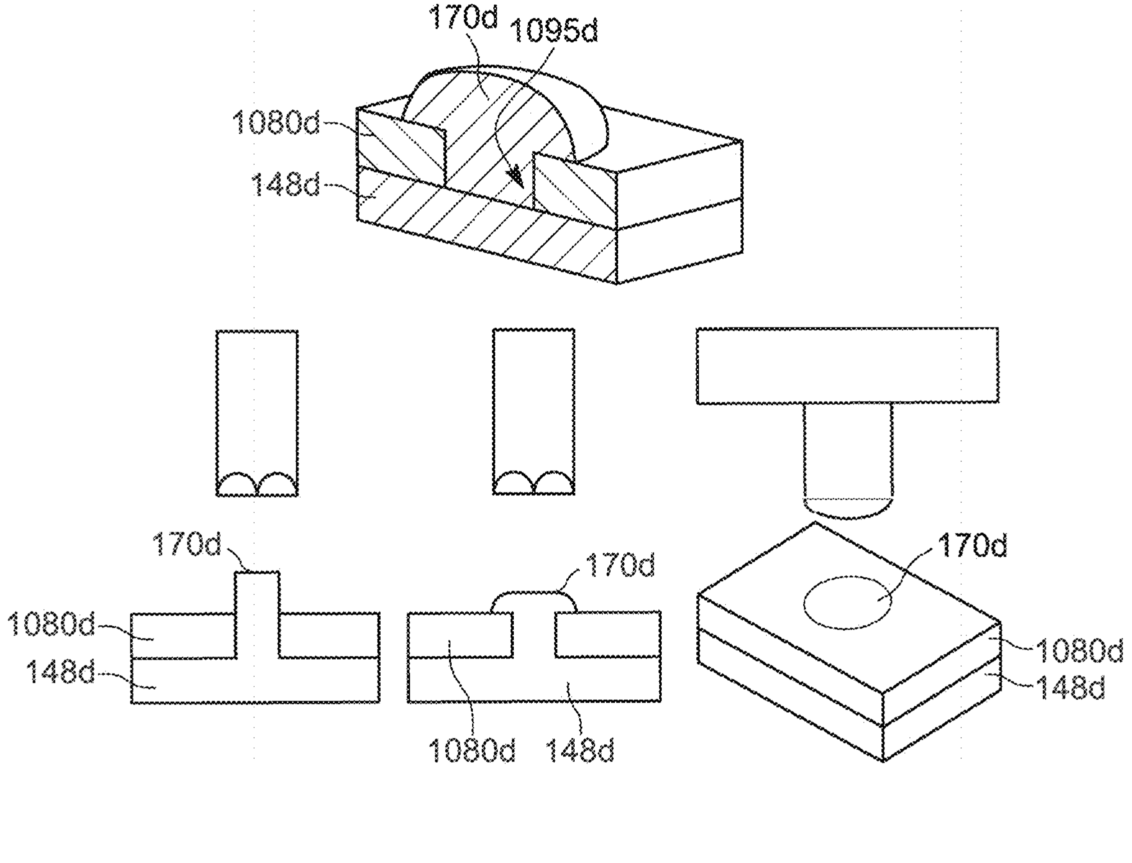
FIG. 32 illustrates portions of an electric motor according to another embodiment where a bus bar assembly is secured to a stator assembly by a heat staking method.

FIG. 32 illustrates a heat staking method for securing a non-conductive body 1080*d* of a bus bar assembly (not shown) to a molded insulator 148*d* of a stator assembly (not shown). Any of the bus bar assemblies 1036, 1036*a*, 1036*b*, 1036*c*, etc., described herein can be secured to the stator assemblies 120, 120*a*. 120*b*, 120*c*, etc., using the heat staking method in place of, or in addition to, the methods already described herein (e.g., threaded fasteners, ultrasonic welding, thermal pressing, etc.). The heat staking method can be used for post and radial arm structures similar to those shown in FIGS. 26-31. During the heat staking method, an axially protruding stake or post 170*d* of the insulator 148*d* is pressed into an aperture 1095*d* of the non-conductive body 1080*d* before any heating step. The post 170*d* is formed having an axial length greater than an axial length of the aperture 1095*d*, so that an end portion of the post 170*d* protrudes beyond a rim of the aperture 1095*d*. The end portion of the post 170*d* is heated until partially melted to form a dome or flange over the rim of the aperture 1095*d*. This provides a secure mechanical connection between the insulator 148*d* and the non-conductive body 1080*a*.

Figure 33:
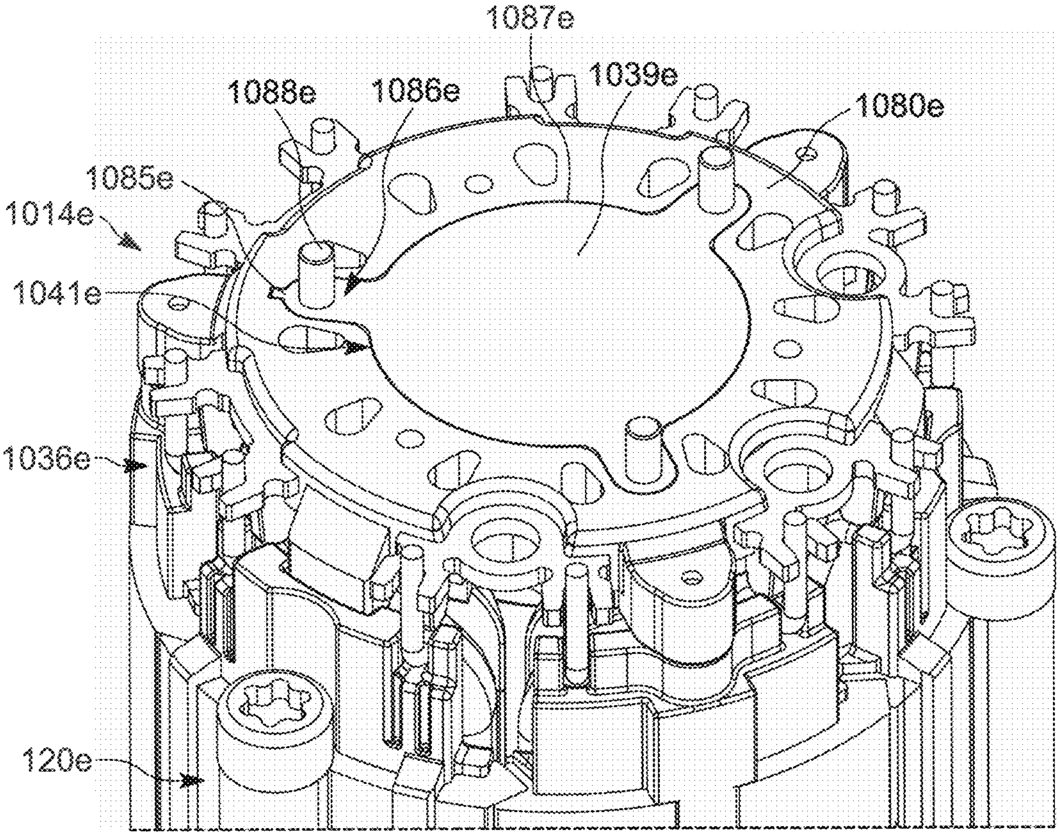
FIG. 33 is a partial perspective view of an electric motor according to another embodiment where a circuit board assembly is secured to a bus bar assembly by a heat staking method.

FIG. 33 illustrates portions of an electric motor 1014*e* according to another embodiment of the disclosure. The electric motor 1014*e* includes a PCBA 1039*e* that is secured to a non-conductive body 1080*e* of a bus bar assembly 1036*e* by a heat staking method. The electric motor 1014*e* is similar in many respects to the electric motor 1014*c* described herein in connection with FIGS. 29-31, and as such, the following description will focus on the differences between the motors 1014*c* and 1014*e*.

In this embodiment, the bus bar assembly 1036*e* is secured to a stator assembly 120*e* via the thermal press method described herein in connection with FIGS. 29-31. The PCBA 1039*e* (e.g., a position sensor circuit board) is generally annular in shape and received into a corresponding centrally located, annularly shaped recess 1041*e* defined in the non-conductive body 1080*e*. The PCBA 1039*e* covers at least a portion of a bearing pocket (not shown, but see FIG. 25 illustrating a similar bearing pocket 1090*a*). The PCBA 1039*e* includes three mounting arms 1085*e* protruding radially outward from an otherwise circular peripheral edge 1087*e* of the PCBA 1039*e*. The mounting arms 1085*e* are angularly spaced equidistantly from one another and each define a mounting aperture 1086*e*. The non-conductive body 1080*e* includes three mounting posts 1088*e* protruding axially away from an outer surface thereof.

During the heat staking method, the PCBA 1039*e* is inserted into the recess 1041*e* prior to any heating step. The mounting posts 1088*e* are received into the corresponding mounting apertures 1086*e*. The mounting posts 1088*e* have an axial length greater than an axial length of the mounting apertures 1086*e*, so that an end portion of the post 1088*e* protrudes beyond a rim of the respective mounting aperture 1086*e*. The end portion of the post 1088*e* is heated until partially melted to form a dome or rivet over the rim of the aperture 1086*e* and over a portion of the surface of the PCBA 1039*e*. This provides a secure mechanical connection between the insulator PCBA 1039*e* and the non-conductive body 1080*e*.

Securing the PCBA 1039*e* to the bus bar assembly 1036*e* by heat staking the mounting posts 1088*e* provides advantages over using threaded fasteners. For example, because there are conductors extending within the non-conductive body 1080*e*, any threaded bore provided in the non-conductive body can interfere with the conductors. Eliminating the threaded fasteners and instead using heat staked mounting posts 1088*e* avoids this issue and allows the posts to be more freely located as necessary to accommodate the PCBA 1039*e*. This provides size advantages over prior art electric motors, such as allowing the PCBA to be miniaturized without adding material to the non-conductive body to accommodate threaded bores of sufficient depth which would otherwise increase an overall axial length of the motor assembly.

FIGS. 34-37 illustrate a bus bar assembly 1036*f* and a PCBA 1039*f* according to another embodiment. The bus bar assembly 1036*f* and the PCBA 1039*f* are similar in many respects to the bus bar assembly 1036*e* and the PCBA 1039*e* described herein in connection with FIG. 33, and the following description will focus on some differences between them.

In this embodiment, the PCBA 1039*f* is secured to a non-conductive body 1080*f* of the bus bar assembly 1036*f* by a heat staking method. The PCBA 1039*f* (e.g., a position sensor circuit board) is generally annular in shape and received into a corresponding centrally located, annularly shaped recess 1041*f* defined in the non-conductive body 1080*f*. The PCBA 1039*f* covers at least a portion of a bearing pocket 1090*f* defined in a central region of the non-conductive body 1080*f*. The PCBA 1039*f* includes a circular peripheral edge 1087*f* and defines three mounting apertures 1086*f* that are each positioned adjacent the circular peripheral edge 1087*f* and angularly spaced from one another at equal intervals. The PCBA 1039*f* also defines a locating notch 1089*f* that interrupts the circular peripheral edge 1087*f*. The non-conductive body 1080*f* includes a corresponding locating protrusion 1091*f* that interrupts a circular peripheral edge 1092*f* of the recess 1041*f* and protrudes into the recess 1041*f*. The locating notch 1089*f* receives the locating protrusion 1091*f* to properly orient the PCBA 1039*f* relative to the bus bar assembly 1036*f* during assembly. In other embodiments (not shown), the protrusion may instead be provided on the PCBA 1039*f* and the non-conductive body 1080*f* may define the corresponding notch.

Figure 34:
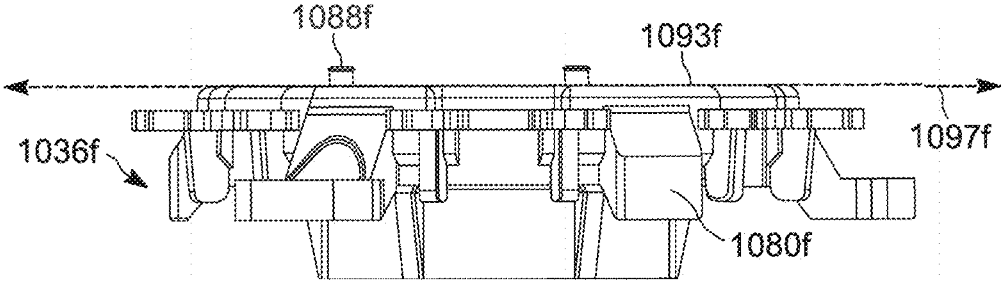
FIG. 34 is a side view of a bus bar assembly according to another embodiment.
Figure 35:
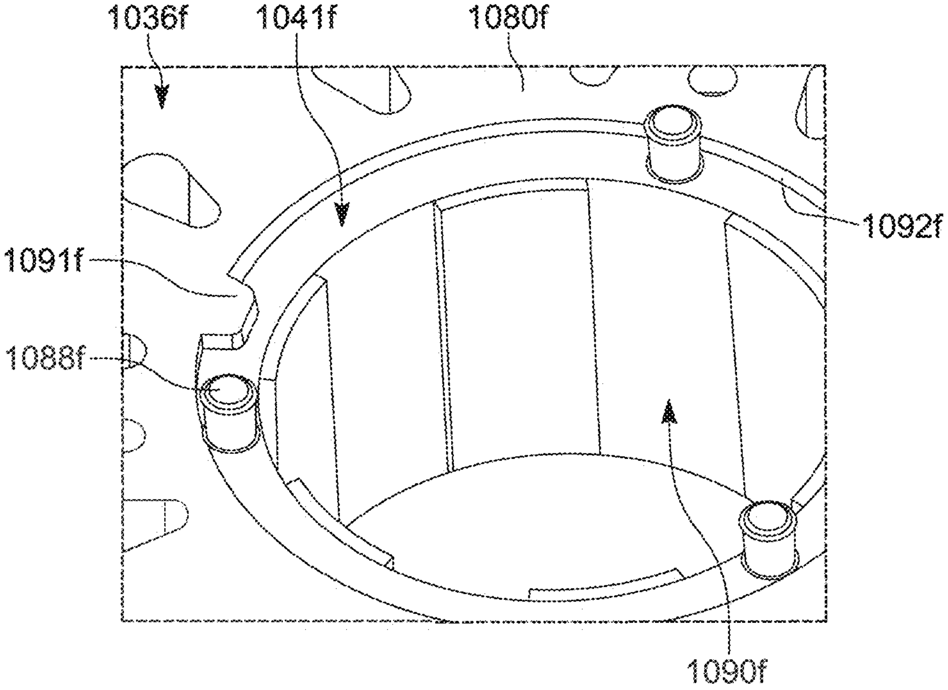
FIG. 35 is a partial perspective view of the bus bar assembly of FIG. 34.
Figure 36:
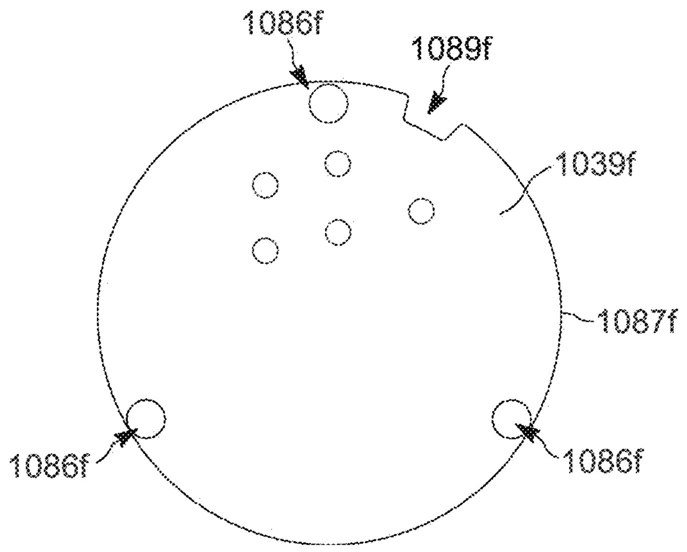
FIG. 36 is a top view of a circuit board assembly that can be coupled to the bus bar assembly of FIG. 35 by a heat staking method.
Figure 37:
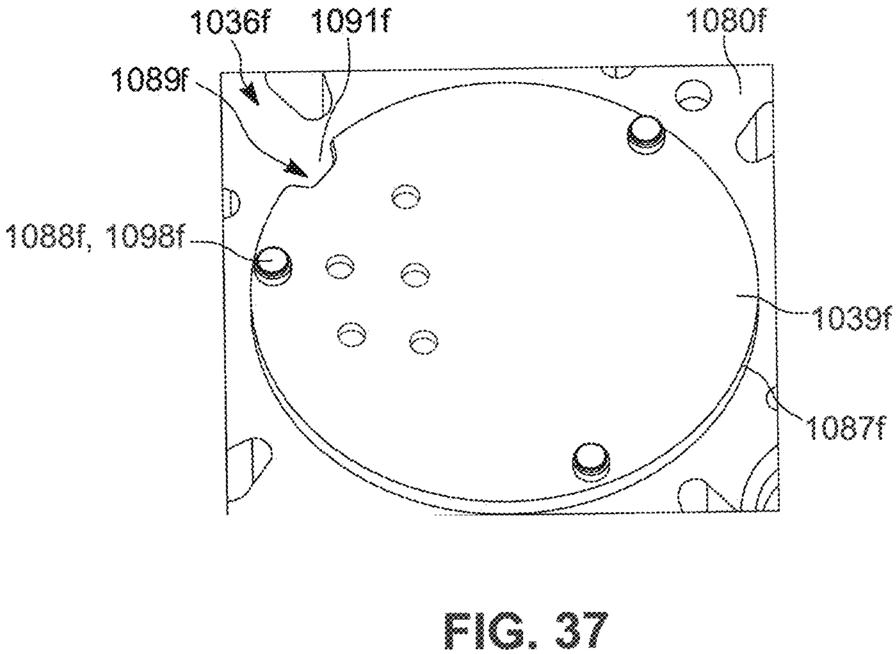
FIG. 37 is a partial perspective view illustrating the circuit board assembly of FIG. 36 secured to the bus bar assembly of FIG. 34 by heat staking.

The non-conductive body 1080*f* includes three mounting posts 1088*f* protruding axially away from a bottom surface of the recess 1041*f*. As shown in FIG. 34, the mounting posts 1088*f* protrude beyond an axial end face 1093*f* of the non-conductive body 1080*f*. In other words, the axial end face 1093*f* of the non-conductive body 1080*f* defines a flat plane 1097*f*, and the mounting posts 1088*f* protrude beyond the flat plane 1097*f*.

During the heat staking method, the PCBA 1039*f* is inserted into the recess 1041*f* prior to any heating step. The mounting posts 1088*f* are received into the corresponding mounting apertures 1086*f*, and the locating protrusion 1091*f* is received into the locating notch 1089*f* to orient the PCBA 1039*f*. The mounting posts 1088*f* have an axial length greater than an axial length of the mounting apertures 1086*f*, so that an end portion of the post 1088*f* protrudes beyond a rim of the respective mounting aperture 1086*f*. The end portion of the post 1088*f* is heated until partially melted to form a dome or rivet 1098*f* over the rim of the mounting aperture 1086*f* and over a portion of the surface of the PCBA 1039*f*. This provides a secure mechanical connection between the insulator PCBA 1039*f* and the non-conductive body 1080*f*.

Although the disclosure has been described in detail with reference to certain preferred embodiments, variations and modifications exist within the scope and spirit of one or more independent aspects of the disclosure as described.

What is claimed is:

1. A method of assembling an electric motor, the method comprising:

providing a rotor assembly including a rotor shaft;

providing a stator assembly including a core, an insulator at least partially covering the core, and a plurality of windings;

providing a bus bar assembly including a non-conductive body and a plurality of conductors;

ultrasonically welding the non-conductive body to the insulator;

making an electrical connection between at least two windings of the plurality of windings and the plurality of conductors; and inserting a bearing within a bearing pocket of the non-conductive body, wherein the bearing pocket defines an outer circumferential surface, and wherein the insulator includes a coil protector portion having an inner annular surface, and wherein ultrasonically welding the non-conductive body to the insulator produces an ultrasonic weld located where the outer circumferential surface contacts the inner annular surface.

2. The method of claim 1, wherein the non-conductive body includes an inboard surface facing toward the insulator, and wherein the insulator includes a coil protector portion having an axially outer surface, and wherein ultrasonically welding the non-conductive body to the insulator produces an ultrasonic weld located where the inboard surface contacts the axially outer surface.

* * * * *